(12) United States Patent
Hussaini et al.

(10) Patent No.: US 12,489,128 B2
(45) Date of Patent: Dec. 2, 2025

(54) SENSOR AND METHOD FOR MONITORING GAS QUALITY IN FUEL CELL SYSTEM

(71) Applicant: GE Vernova Infrastructure Technology LLC, Greenville, SC (US)

(72) Inventors: Irfan Saif Hussaini, Glenville, NY (US); Keith Garrette Brown, Clifton Park, NY (US); Andrew P. Shapiro, Schenectady, NY (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 524 days.

(21) Appl. No.: 17/999,797

(22) PCT Filed: Jun. 7, 2021

(86) PCT No.: PCT/US2021/036142
§ 371 (c)(1),
(2) Date: Nov. 23, 2022

(87) PCT Pub. No.: WO2021/252340
PCT Pub. Date: Dec. 16, 2021

(65) Prior Publication Data
US 2023/0238555 A1 Jul. 27, 2023

Related U.S. Application Data

(60) Provisional application No. 63/035,975, filed on Jun. 8, 2020.

(51) Int. Cl.
*H01M 8/04* (2016.01)
*H01M 8/04537* (2016.01)
*H01M 8/12* (2016.01)

(52) U.S. Cl.
CPC ........... *H01M 8/04552* (2013.01); *H01M 2008/1293* (2013.01)

(58) Field of Classification Search
CPC ........... H01M 8/04552; H01M 2008/1293
USPC ............................................... 429/432
See application file for complete search history.

(56) References Cited

U.S. PATENT DOCUMENTS

| | | | | |
|---|---|---|---|---|
| 3,927,555 A | * | 12/1975 | Godwin | G01N 33/0027 73/31.01 |
| 7,968,243 B2 | | 6/2011 | Barrett | |
| 2004/0197621 A1 | | 10/2004 | Balliet et al. | |
| 2005/0095491 A1 | * | 5/2005 | Tarver | H01M 8/2485 429/513 |
| 2009/0246571 A1 | | 10/2009 | Kading et al. | |
| 2012/0040264 A1 | | 2/2012 | Maslyn et al. | |
| 2013/0137007 A1 | | 5/2013 | Lee et al. | |

(Continued)

OTHER PUBLICATIONS

Jung et al. High-concentration Nafion-based hydrogen sensor for fuel-cell electric vehicles. Solid State Ionics, vol. 344, 2020, 115134. Retrieved from https://www.sciencedirect.com/science/article/pii/S0167273819306654 (Year: 2020).*

(Continued)

*Primary Examiner* — James M Erwin
(74) *Attorney, Agent, or Firm* — Buckley, Maschoff & Talwalkar LLC

(57) ABSTRACT

The subject matter described herein generally relates to a sensor and method for monitoring gas quality of a fuel reformer in a fuel cell system or a power generation system.

18 Claims, 3 Drawing Sheets

(56) References Cited

U.S. PATENT DOCUMENTS

2017/0062799 A1   3/2017  Song et al.
2020/0158683 A1   5/2020  Preston et al.

OTHER PUBLICATIONS

PCT Search Report and Written Opinion prepared for PCT Application No. PCT/US2021/036142, completed Sep. 30, 2021.
Izumi, Masaaki, et al. "Measurement of hydrogen gas concentration in fuel electrode of fuel electrode-supported SOFC," 2017, Transactions of the JSME, Jan. 1, 2018 Japan Society of Mechanical Engineers (JSME), vol. 84, Nr: 857, pp. 1-11.

* cited by examiner

SENSOR AND METHOD FOR MONITORING GAS QUALITY IN FUEL CELL SYSTEM

CROSS-REFERENCE TO RELATED APPLICATIONS

This application is a national stage entry under 35 U.S.C. § 371(b) of PCT International Application No. PCT/US2021/036142, filed Jun. 7, 2021, which claims priority under 35 U.S.C. § 119(e) to U.S. Provisional Application Ser. No. 63/035,975 filed on Jun. 8, 2020, the entire disclosures of all of which are incorporated herein by reference.

FIELD

The subject matter described herein generally relates to a sensor and method for monitoring gas quality of a fuel reformer in a fuel cell system or a power generation system.

BACKGROUND

A power generation system may comprise one or more fuel cell systems or fuel cells. Fuel cells may operate in stationary, semi-stationary, or portable applications. Certain fuel cells, such as solid oxide fuel cells (SOFCs), may operate in large-scale power systems that provide electricity to satisfy industrial and municipal needs. Other fuel cells may be useful for smaller portable applications such as, for example, powering cars or boats. In practice, fuel cells are typically amassed in electrical series in an assembly of fuel cells to produce power at useful voltages or currents to generate an external power application.

In addition to one or more fuel cells, a power generation system may further comprise a fuel reformer for reforming hydrocarbon fuel. A fuel reformer is a device that uses the byproduct(s) of the fuel cell (e.g., steam) to convert hydrocarbon fuel (e.g., methane) into a reformed stream that contains substantial amounts of hydrogen. The reformed stream comprising the hydrogen may then be circulated to the fuel cell to produce electricity at improved efficiency.

Use of such a power generation or fuel cell system over time degrades the reformer. For example, most fuel reformers often experience degradation after about three to five years of use, which is the typical timeframe to employ the present sensor or methods. Degradation of the fuel reformer often occurs due to the sintering of precious catalytic metals over time, such as nickel, rhodium, and others.

Degradation of the fuel reformer often results in reduced amounts of hydrogen being generated or output by the reformer to fuel the fuel cell. Large, expensive devices are currently employed in the art to monitor the gas composition and quality of fuel generated by a fuel reformer for use in a fuel cell system. However, currently, there is no direct or easy way to assess the efficacy, efficiency, and/or degradation of a fuel reformer. As such, there is a need to develop a cost-effective, sensory system and methodology to monitor the efficiency and efficacy of a fuel reformer.

SUMMARY OF THE INVENTION

The present disclosure is directed to a sensor for measuring the quality of fuel in a fuel cell system, comprising: 1) a housing, 2) an anode, a cathode, and an electrolyte, 3) a heater, and 4) one or more wires. The wires are coupled with the anode and cathode and measure the electrical potential from the anode to the cathode across the electrolyte. The electrical potential is an estimated value of the hydrogen content of fuel in the fuel cell system. The hydrogen content indicates the quality of fuel in the fuel cell system.

The heater of the sensor provides a constant temperature from the anode to the cathode and across the electrolyte ranging from about 300° C. to about 800° C. For example, in one embodiment, the heater provides a constant temperature at about 700° C.

The sensor of the present disclosure comprises a fuel cell. In one embodiment, the fuel cell of the sensor may be a solid oxide fuel cell (SOFC). In another embodiment, the fuel cell of the sensor is a button or a miniature fuel cell. In one embodiment, the button or miniature fuel cell of the sensor has a size ranging from about 1 mm to about 5 mm.

The present disclosure is also directed to a method of using one or more of the present sensors to estimate hydrogen content of fuel in a fuel cell system. In one embodiment, the method may comprise placing one or more wires of the one or more sensors at the anode of a fuel cell. Further, the method may comprise measuring the voltage of the sensor. The voltage is proportional to the value of the hydrogen content of fuel in the fuel cell system.

The method of using one or more sensors to estimate the hydrogen content of fuel in a fuel cell system may further comprise a heater that provides a constant temperature from the anode to the cathode and across the electrolyte ranging from about 300° C. to about 800° C. For example, in one embodiment, the heater provides a constant temperature at about 700° C. In one embodiment of the present method, the fuel cell is a solid oxide fuel cell (SOFC).

The present disclosure is also directed to a method of using one or more of the present sensors to measure the efficacy of a fuel reformer. In one embodiment, the method may comprise placing a sensor at the inlet of the fuel reformer. The method may also comprise placing a sensor at the outlet of the fuel reformer. The method may further comprise measuring the difference in voltage of the sensor located at the outlet of the fuel reformer and the voltage measured at the sensor located at the inlet of the fuel reformer at a constant temperature.

The fuel reformer is estimated to be degraded when the difference in sensor voltage is decreased over time. The fuel reformer is estimated to not be degraded when the difference in sensor voltage measured remains relatively unchanged (i.e., constant) over time.

The method of using one or more sensors to measure the efficacy of a fuel reformer may further comprise a heater that provides a constant temperature from the anode to the cathode and across the electrolyte ranging from about 300° C. to about 800° C. For example, in one embodiment, the heater provides a constant temperature at about 700° C. In one embodiment of the present method, the fuel cell is a solid oxide fuel cell (SOFC).

Finally, the present disclosure is directed to a method of utilizing one or more of the present sensors to measure the difference in sensor voltage and estimate the efficacy of a fuel reformer. In one embodiment, the method may comprise placing a sensor at the inlet of the fuel reformer. The method may also comprise placing a sensor at the outlet of the fuel reformer. The method may further comprise measuring the difference in voltage measured at the sensor located at the outlet of the fuel reformer and the voltage measured at the sensor located at the inlet of the fuel reformer at a constant temperature.

The fuel reformer is estimated to work properly and not be degraded when the difference in voltage remains constant over time. The fuel reformer is estimated to be degraded when the difference in voltage is decreased over time.

The method of utilizing one or more sensors to measure the difference in sensor voltage and estimate the efficacy of a fuel reformer comprises a constant temperature that ranges from about 300° C. to about 800° C. In one embodiment of the present method, the fuel cell is a solid oxide fuel cell (SOFC).

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION OF THE INVENTION

The present disclosure is directed to a power generation system. The power generation system of the present disclosure may comprise one or more fuel cell systems. The present power generation or fuel cell system may comprise one or more fuel cells.

The one or more fuel cells of the present disclosure may include, but are not limited to, a phosphoric acid fuel cell (PAFC), a molten carbonate fuel cell (MCFC), a proton exchange membrane fuel cell (PEMFC), and a solid oxide fuel cell (SOFC). In one embodiment, the fuel cell is a SOFC.

The power generation system or fuel cell system of the present disclosure may also comprise a fuel reformer ("a reformer"). In one embodiment, the power generation system or fuel cell system of the present disclosure may comprise one or more fuel cells and one or more fuel reformers. A fuel reformer of the present disclosure enables reforming (i.e., reformation) or converting of hydrocarbon fuels to produce hydrogen.

Hydrogen may be provided to one or more fuel cell systems and/or one or more fuel cells via local reforming mechanisms of a fuel by a fuel reformer (e.g., on-site steam reforming). Alternatively, hydrogen may be provided to one or more fuel cell systems and/or one or more fuel cells by remote reforming of a fuel by a fuel reformer. For example, reformation of a fuel comprising carbon-based feedstocks, such as natural gas and other hydrocarbon fuels and feedstocks, may occur to convert compositions in the fuel (e.g., methane) to hydrogen. Examples of hydrocarbon fuel sources used to produce hydrogen for fuel cell systems or a fuel cell include, but are not limited to, natural gas, methane, ethane, propane, methanol, and other hydrocarbons.

Typical fuels comprise many different compositions, including but not limited to hydrogen, water vapor, carbon monoxide, methane, and carbon dioxide. The ability of a fuel reformer to optimally convert these fuel compositions, particularly methane, to hydrogen in order to fuel a fuel cell system and/or fuel cell is critical to produce optimal power generation by the fuel cell. More specifically, the amount, quantity, and difference of hydrogen generated and produced by a fuel reformer over time as compared to the amount of hydrogen in the fuel upon entrance from the fuel reformer is an indicator of the efficacy and efficiency of performance of the fuel reformer.

Accordingly, the fuel reformer of the present power generation or fuel cell system may comprise, consist essentially of, or consist of one or more sensors. The present reformer may also be configured to incorporate, to be coupled with, or affixed to one or more sensors. In one embodiment, a reformer or fuel cell system may comprise one sensor. In another embodiment, a reformer or fuel cell system may comprise two sensors. In a further embodiment, a reformer or fuel cell system may comprise more than two sensors, such as three to five or three to ten sensors.

Figure 1:
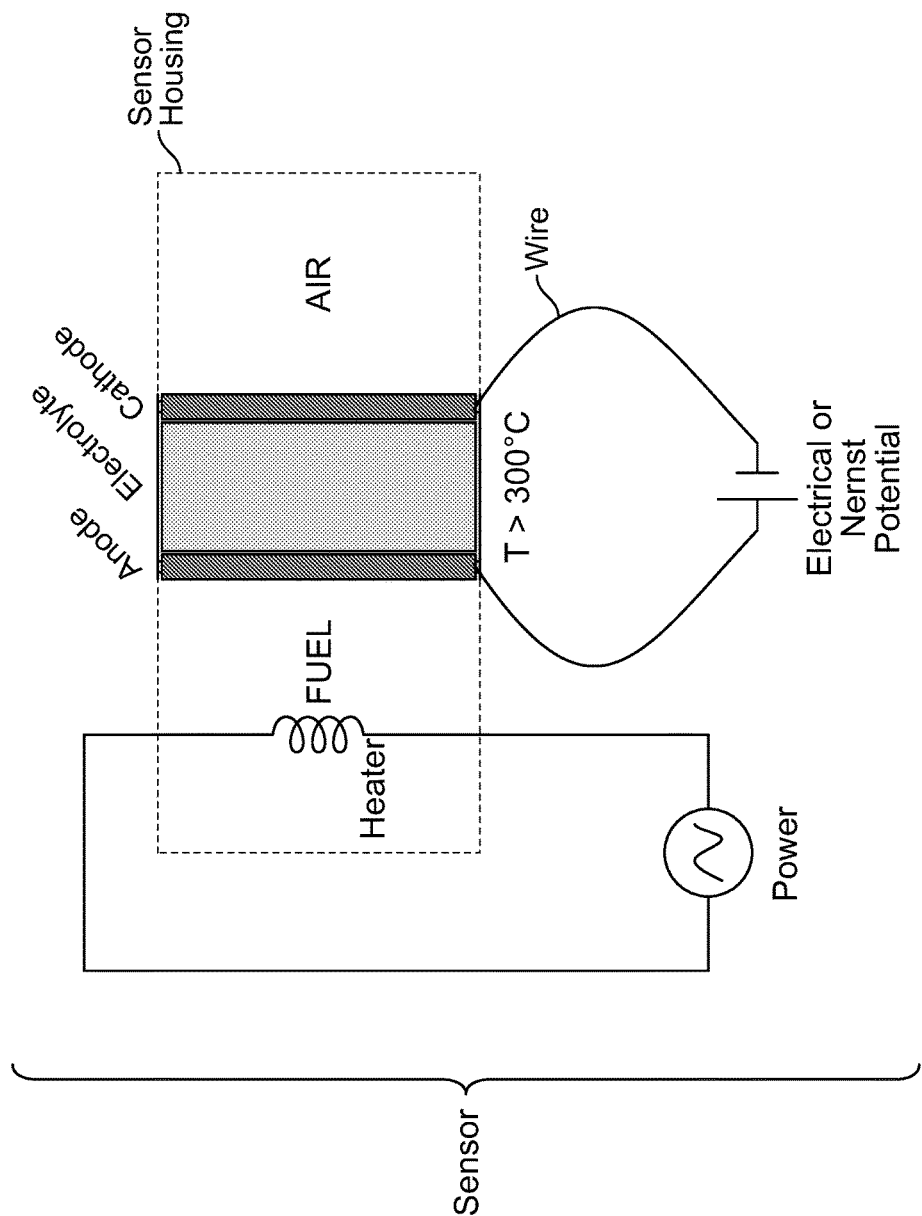
FIG. 1 illustrates one embodiment of a sensor of the present disclosure.

A sensor of the present disclosure may comprise a housing (see the dotted lines in FIG. 1). The housing of the sensor may be any size or shape, and made of any material and/or metal sufficient to contain the components of the sensor such that they may properly perform their functions as described herein.

In one embodiment, the housing of the present sensor made be comprised of high temperature materials. In one embodiment, a high temperature material may be a steel. In another embodiment, the steel may be a 310H steel, for example.

A sensor of the present disclosure may also comprise a fuel cell. In one embodiment, the sensor of the present disclosure is a fuel cell. The fuel cell of the present sensor may be in any size or shape (e.g., a circle, square, or rectangle). In one embodiment, the sensor of the present disclosure is a small fuel cell having a size ranging from about 0.01 to about 0.5 squared centimeters ($cm^2$).

In one embodiment, the sensor is a button or miniature fuel cell. The button or miniature fuel cell of the present sensor may be in any size or shape (e.g., a circle, square, or rectangle). In one embodiment, the button or miniature fuel cell may be in the size ranging from about 1 to about 5 millimeters in diameter.

The fuel cell of the sensor of the present disclosure may include, but is not limited to, a phosphoric acid fuel cell (PAFC), a molten carbonate fuel cell (MCFC), a proton exchange membrane fuel cell (PEMFC), and a solid oxide fuel cell (SOFC), all generally named after the material comprised in the electrolyte portion of the fuel cell or sensor. As such, the sensor of the present disclosure may comprise two electrodes (e.g., an anode and a cathode) and an electrolyte (see FIG. 1). In one embodiment, one or more of the electrodes are comprised of metal, such as any metal known in the art to produce electrodes.

The anode, cathode, and electrolyte of the present sensor act as a typical fuel cell, such that fuel is converted to electricity by electrochemically combining the fuel at the anode and an oxidant (e.g., air) at the cathode across the ionic conducting electrolyte layer (see FIG. 1). At high operating temperatures, the electrolyte transfers electrically charged particles from one electrode (e.g., an anode) to the other electrode (e.g., a cathode) and is otherwise substantially impermeable to both the fuel and the oxidant (see FIG. 1).

When the present sensor is placed in a gas stream of the fuel cell, the sensor measures an electrochemical potential difference between the two electrodes (e.g., the anode and cathode). This electrical potential ("potential") at equilibrium is sometimes called the Nernst potential. The electrical potential or Nernst potential is calculable according to the equation below. Importantly, the electrical potential or Nernst potential is primarily determined as a function of the gas composition of the fuel and the operating temperature.

$$E_{nernst} = E_0(T) + \frac{R_u T}{nF} \log\left(\frac{[H_2][O_2]^{0.5}}{[H_2O]}\right)$$

The present sensor may comprise one or more electrical wires coupled to the anode and/or cathode of the fuel cell to measure the potential across the electrolyte (see FIG. 1). In one embodiment, the present sensor comprises one wire at the anode and one wire at the cathode to measure the electrical potential across the fuel cell electrolyte from each electrode (see FIG. 1).

The potential measured by the sensor (according to the equation noted above) correlates to and/or is proportional with the hydrogen ($H_2$) content of the fuel (see FIG. 1). Similarly, the voltage or potential measured by the sensor correlates to and/or is proportional with the amount or quantity of $H_2$ present in the fuel (see FIG. 1). Conversely, the $H_2$ content of the fuel correlates to and/or is proportional with the potential and the voltage generated by the fuel cell of the sensor. As such, the potential and/or voltage measured by the present sensor is and may be used as a substitute, proxy, or predictive/estimated value for the actual $H_2$ content measurement of fuel, which is often provided by large, expensive equipment currently used in the art.

In one embodiment an operating temperature required for the sensor of the present disclosure is at or above 300° C., as it is typically around this temperature when the electrolyte of the fuel cell or sensor becomes active. Temperatures below 300° C. are often insufficient to activate the electrolyte and generate voltage or potential. Therefore, in one embodiment, the operating temperature of the present sensor is not below 300° C. In another embodiment, the operating temperature of the present sensor is not below 500° C.

Generally, however, the operating temperature of the present sensor may range from about 300° C. to about 800° C., from about 400° C. to about 800° C., or from about 500° C. to about 800° C. In some embodiments, the operating temperature may range from about 500° C. to about 800° C.±10-20° C. In other embodiments, the operating temperature of the present sensor may range from about 600° C. to about 800° C. For example, the operating temperature may range from about 650° C. to about 850° C., from about 650° C. to about 800° C., from about 700° C. to about 800° C., and from about 700° C. to about 750° C. In one embodiment, the operating temperature of the present sensor is at or about 700° C.

Heat is typically required for the present sensor to reach the high operating temperature required for proper function. Heat for the sensor is generally provided either by flowing fluids or externally by any means of heat known in the art, including but not limited to the sun, fire, electricity, etc. In one embodiment, heat of the sensor is provided by a heater (see FIG. 1). Any heater known in the art that can provide constant and consistent temperatures at or above 300° C. is sufficient for the present sensor. An illustrative heater of the present sensor and method is capable of providing a constant and consistent temperature between the reformer inlet (RI) and the reformer outlet and/or stack inlet (RI/SO), which generally have a tendency, particularly during operations, to have very different temperature spectrums.

It is important for proper function of the present sensor that the high operating temperature be maintained constant and consistent. Since the electrical potential measured by the present sensor is dependent on temperature (as indicated by the equation above), inconsistent temperatures and/or temperature fluctuations are not tolerated by the present sensor and method, and may negatively affect proper assessment and/or measurement of the potential or voltage. As such, in one embodiment, the temperature of the present sensor does not fluctuate any more than about ±1-5° C., ±5-10° C., or ±10-20° C. from a high operating temperature ranging from about 500° C. to about 800° C.

A method of using one or more sensors of the present disclosure is also provided. More specifically, a method of measuring the fuel quality (e.g., hydrogen ($H_2$) content) of a fuel cell system using the electrical potential (e.g., Nernst potential) and/or voltage measured by one or more sensors of the present disclosure is provided herein. A method of measuring the electrical potential of a fuel cell system is also provided herein. In addition, a method of measuring the efficiency or efficacy of a fuel reformer using the difference in the potential and/or voltage measured by one or more sensors of the present disclosure is provided herein. Finally, the present methods may comprise utilizing the difference in the potential and/or voltage measured by one or more sensors of the present disclosure to assess the efficiency or efficacy of a fuel cell system.

The present methods comprise one or more sensors of the present disclosure. In one embodiment, methods of the present disclosure may comprise one, two, or three or more sensors. In another embodiment, methods of the present disclosure may comprise, consist essentially of, or consist of two of the subject sensors.

In an illustrative embodiment of the present method, two such sensors maintained at the same operating temperature (as previously described) and placed across a chemical reactor, such as a fuel reformer, may measure the lack of change or increase in electrical potential through the reforming reaction. This lack of change (i.e., relatively no difference or unchanged potential or voltage) or an increase in the potential is indicative of the extent of the reforming reaction, and may be used to quantify the performance, efficacy, and/or efficiency of the fuel reformer.

Figure 2:
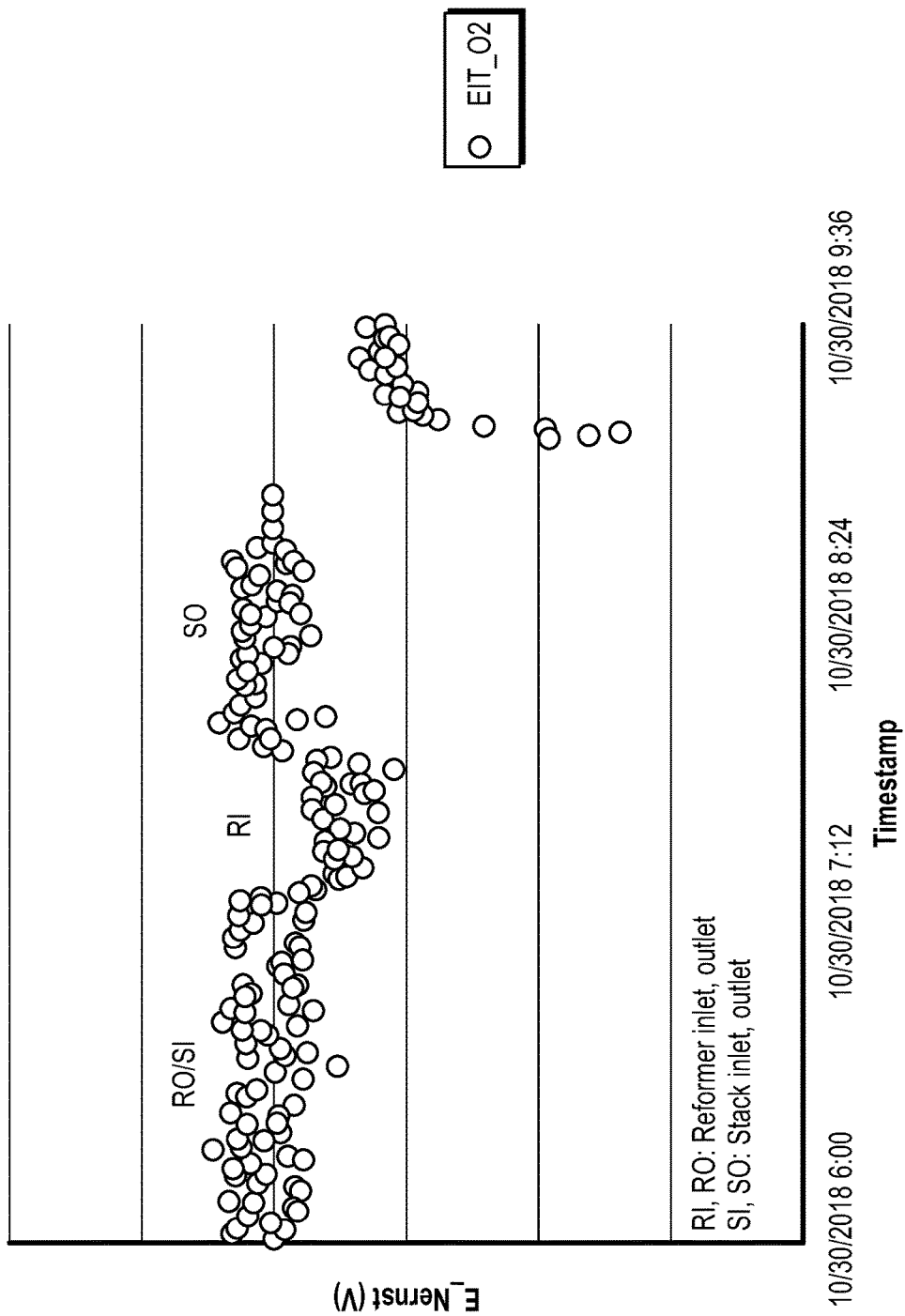
FIG. 2 is a graph showing test data generated by a sensor of the present disclosure.
Figure 3:
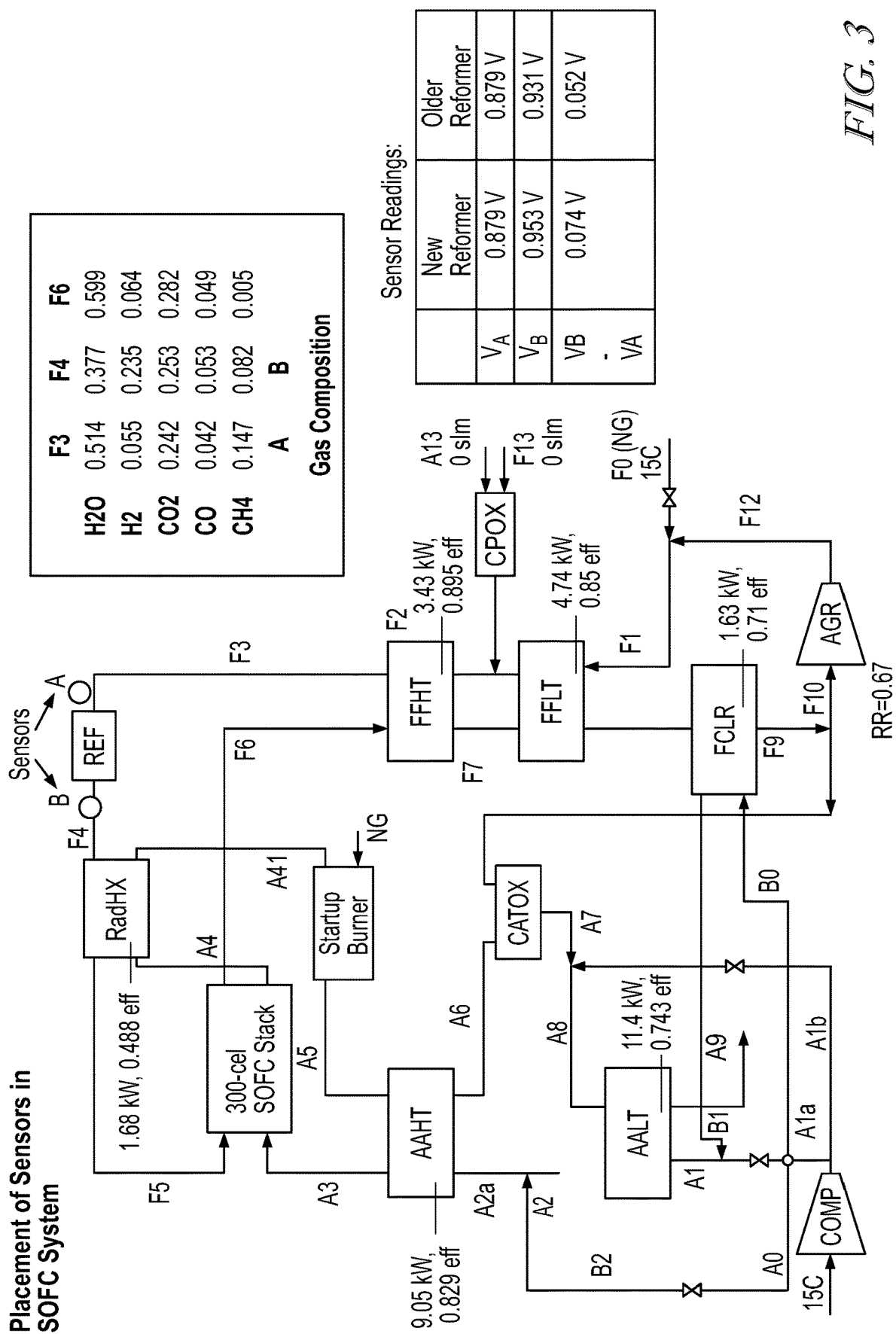
FIG. 3 is a schematic diagram of a fuel cell system (e.g., solid oxide fuel cell system) comprising a fuel reformer, a solid oxide fuel cell stack, and two embodiments of a sensor of the present disclosure.

In one embodiment of the present methods, one or more sensors of the present disclosure may positioned or located at the reformer inlet (RI) or the inlet of the reformer where fuel enters the reformer (see FIGS. 2 and 3). A sensor placed at the RI may measure and/or monitor the gas composition of fuel as it enters the reformer (see FIGS. 2 and 3). In one embodiment, a sensor positioned, placed, or located at the RI may measure and/or monitor the electrical potential and/or voltage, which correlates to, is proportional with, and may be a substitute for the hydrogen composition of the fuel entering the fuel reformer. As such, the potential and/or voltage also serves as a predictive or estimated measure of the $H_2$ content of the fuel.

In one embodiment of the present methods, one or more sensors of the present disclosure may be positioned or located at the reformer outlet (RO) or the outlet of the reformer where hydrogen exits the reformer and enters the fuel cell stack or the fuel cell stack inlet (SI). A sensor placed at the RO/SI may measure and/or monitor the gas composition of fuel as it exits the reformer and enters the fuel cell stack (see FIGS. 2 and 3). In one embodiment, a sensor positioned, placed, or located at the RO/SI may measure and/or monitor the electrical potential and/or voltage, which correlates to, is proportional with, and may be a substitute or proxy measurement for the hydrogen composition of the fuel exiting the fuel reformer. As such, the potential and/or voltage also serves as a predictive or estimated measure of the $H_2$ content of the fuel.

In one embodiment of the present methods, one or more sensors of the present disclosure may also be positioned, placed, or located at both the reformer inlet (RI) and the reformer outlet and stack inlet (RO/SI) of the reformer (see FIGS. 2 and 3). For example, in one embodiment, a first sensor of the present disclosure may be positioned at the inlet of the fuel reformer (RI) while a second sensor may be positioned at the outlet of the fuel reformer and inlet of the fuel cell stack (RO/SI), so as to measure and/or monitor the quality and composition of fuel as it enters and exits a fuel reformer (see FIGS. 2 and 3). In one embodiment, the first sensor is positioned at the inlet of the fuel reformer (RI) while a second sensor is positioned at the outlet of the fuel reformer and inlet of the fuel cell stack (RO/SI), so as to measure and/or monitor the electrical potential and/or voltage, which correlates to, is proportional with, and may be a substitute for hydrogen ($H_2$) as it enters and exits a fuel reformer (see FIGS. 2 and 3). As such, the potential and/or voltage also serves as a predictive or estimated measure of the $H_2$ content of the fuel.

In a further embodiment of the present methods, one or more sensors of the present disclosure may also be positioned, placed, or located at both the reformer inlet (RI), the reformer outlet and fuel stack inlet (RO/SI), and the fuel cell stack outlet (SO) of the reformer (see FIGS. 2 and 3). For example, in one embodiment, a first sensor of the present disclosure may be positioned at the inlet of the fuel reformer (RI), a second sensor may be positioned at the outlet of the fuel reformer and inlet of the fuel cell stack (RO/SI), and a third sensor may be positioned at the outlet of the fuel cell stack (SO) downstream of the fuel reformer (see FIG. 3), so as to measure and/or monitor the quality and composition of fuel (e.g., hydrogen) as it enters and exits a fuel reformer, a fuel cell, or a fuel cell stack (see FIGS. 2 and 3). As such, the electrical potential and/or voltage also serves as a predictive or estimated measure of the $H_2$ content of the fuel.

The mathematical difference (or delta, $\Delta$) between the potential and/or voltage measured at the RO/SI of the fuel reformer and the potential and/or voltage measured at the RI of the fuel reformer indicates the efficacy or efficiency of the fuel reformer. More specifically, the $\Delta$ between the potential and/or voltage may be used to determine the quantity, efficacy, and/or efficiency of the fuel reformer. The higher the mathematical difference (or delta, $\Delta$) between the potential and/or voltage measured at the RO/SI of the fuel reformer and the potential and/or voltage measured at the RI, the greater the efficiency and/or efficacy of the fuel reformer. Similarly, the lower the mathematical difference (or delta, $\Delta$) between the potential and/or voltage measured at the RO/SI of the fuel reformer and the potential and/or voltage measured at the RI, the lower the efficiency and/or efficacy of the fuel reformer For example, in FIG. 3, the voltage measured at the RI of a new fuel reformer fuel reformer ($V_A$) is 0.879V. The voltage measured at the RO/SI of a new fuel reformer fuel reformer ($V_B$) is 0.953V. The mathematical difference (or delta, $\Delta$) between voltage measured at the fuel reformer RO/SI ($V_B$=0.953V) and the voltage measured at the fuel reformer RI ($V_A$=0.879V) is 0.074V.

In FIG. 3, the voltage measured at the RI of an older fuel reformer ($V_A$) is 0.879V. The voltage measured at the RO/SI of an older fuel reformer ($V_B$) is 0.931V. The mathematical difference (or delta, $\Delta$) between voltage measured at the fuel reformer RO/SI ($V_B$=0.931V) and the voltage measured at the fuel reformer RI ($V_A$=0.879V) is 0.052V.

The mathematical difference (or delta, $\Delta$) between the RO/SI and RI voltage measured at the new fuel reformer is $\Delta$=0.074V. The mathematical difference (or delta, $\Delta$) between the RO/SI and RI voltage measured at the older fuel reformer is $\Delta$=0.052V. As such, the new reformer has a $\Delta$=0.074V, which is higher and demonstrates a greater efficacy and efficiency or overall performance for conversion of the gas compositions (e.g. methane) to hydrogen than the older reformer that has a $\Delta$=0.052V.

More specifically, the higher $\Delta$ of the new reformer indicates that it is more efficiently converting fuel gases, such as methane, to hydrogen. Typically a change in $\Delta$ of less than about 2 mV, at identical flow and thermal conditions, indicates a satisfactory performance of the reformer with no major signs of degradation, coking, or wear. Low $\Delta$s in this range also indicate that the reformer should be replaced, repaired, and/or tended to in due course. In contrast, a change in $\Delta$ of greater than about 10 mV, at identical flow and thermal conditions, indicates degradation in performance of the reformer with indications of signs of degradation, coking, or wear.

As such, the present sensor and methods provide improvements, benefits, and advantages of the current art. More specifically, the present sensor and methods negate the need for complex and expensive equipment or devices currently available, and provide a simple, economical sensor alternative to specifically assess hydrogen and that relies on mass-produced parts. Importantly, the present sensor and method monitor the actual fuel composition and not the exhaust gas of the fuel reformer or fuel cell system. Moreover, lab tests in a fuel cell system have demonstrated that the present sensor and method are sensitive enough to respond to change in gas composition.

The method of the present disclosure has utilized the difference in electrical potential across a chemical reactor, such as a fuel reformer, to quantify the performance or efficacy of the reformer. The methods of the present disclosure allow for different components of a fuel reformer to be assessed and measured using one or more sensors of the present disclosure. The sensor and method of the present disclosure provide a new mechanism for measuring the hydrogen ($H_2$) content of the fuel entering and exiting a fuel reformer using the electrical potential and/or voltage, which correlate with or are proportional to the $H_2$ content, as a substitute or a proxy. As such, the potential and/or voltage also serves as a predictive or estimated measure of the $H_2$ content of the fuel.

In addition, the present sensor and methods provide a means for measuring the efficiency or efficacy of a fuel reformer using the difference in the potential and/or voltage measured by one or more sensors of the present disclosure often at the inlet and/or outlet of a fuel reformer. Finally, the present methods may comprise a sensor and method for utilizing the difference in the potential and/or voltage measured by one or more sensors of the present disclosure to assess the efficiency or efficacy of a fuel cell system to convert gases (e.g., methane) to hydrogen ($H_2$) content. The hydrogen produced by a fuel reformer may be further provided to a fuel cell, a fuel cell system, or a power generation system for optimal or increased productivity in generating power (e.g., electricity). As such, the present sensor and method provide unexpected results over the equipment and devices of the current art.

The following numbered embodiments are contemplated and are non-limiting.

1. A sensor for measuring the quality of fuel in a fuel cell system, comprising: (1) a housing, (2) an anode, a cathode, and an electrolyte, (3) a heater, and (4) one or more wires, wherein the wires are coupled with the anode and cathode to measure the electrical potential from the anode to the cathode across the electrolyte, wherein the electrical potential is an estimated value of the hydrogen content of fuel in the fuel cell system, and wherein the hydrogen content indicates the quality of the fuel in the fuel cell system.

2. The sensor of clause 1, any other suitable clause, or any combination of suitable clauses, wherein the sensor comprises a fuel cell.

3. The sensor of clause 2, any other suitable clause, or any combination of suitable clauses, wherein the fuel cell is any size.

4. The sensor of clause 3, any other suitable clause, or any combination of suitable clauses, wherein the fuel cell size ranges from about 0.01 cm$^2$ to about 0.5 cm$^2$.

5. The sensor of clause 2, any other suitable clause, or any combination of suitable clauses, wherein the fuel cell is any shape.

6. The sensor of clause 5, any other suitable clause, or any combination of suitable clauses, wherein the fuel cell shape is a circle.

7. The sensor of clause 5, any other suitable clause, or any combination of suitable clauses, wherein the fuel cell shape is a square.

8. The sensor of clause 5, any other suitable clause, or any combination of suitable clauses, wherein the fuel cell shape is a rectangle.

9. The sensor of clause 2, any other suitable clause, or any combination of suitable clauses, wherein the fuel cell is a solid oxide fuel cell (SOFC).

10. The sensor of clause 2, any other suitable clause, or any combination of suitable clauses, wherein the fuel cell is a button or a miniature fuel cell.

11. The sensor of clause 10, any other suitable clause, or any combination of suitable clauses, wherein the button or a miniature fuel cell is any size.

12. The sensor of clause 11, any other suitable clause, or any combination of suitable clauses, wherein the button or miniature fuel cell size ranges from about 1 mm to about 5 mm in diameter.

13. The sensor of clause 10, any other suitable clause, or any combination of suitable clauses, wherein the button or a miniature fuel cell is any shape.

14. The sensor of clause 13, any other suitable clause, or any combination of suitable clauses, wherein the button or a miniature fuel cell shape is a circle.

15. The sensor of clause 13, any other suitable clause, or any combination of suitable clauses, wherein the button or a miniature fuel cell shape is a square.

16. The sensor of clause 13, any other suitable clause, or any combination of suitable clauses, wherein the button or a miniature fuel cell shape is a rectangle.

17. The sensor of clause 2, any other suitable clause, or any combination of suitable clauses, wherein the fuel cell is a phosphoric acid fuel cell (PAFC).

18. The sensor of clause 2, any other suitable clause, or any combination of suitable clauses, wherein the fuel cell is a molten carbonate fuel cell (MCFC).

19. The sensor of clause 2, any other suitable clause, or any combination of suitable clauses, wherein the fuel cell is a proton exchange membrane fuel cell (PEMFC).

20. The sensor of clause 1, any other suitable clause, or any combination of suitable clauses, wherein the sensor measures an electrical potential difference between the anode and the cathode.

21. The sensor of clause 20, any other suitable clause, or any combination of suitable clauses, wherein the electrical potential difference between the anode and the cathode correlates to the hydrogen ($H_2$) content of the fuel.

22. The sensor of clause 20, any other suitable clause, or any combination of suitable clauses, wherein the electrical potential difference between the anode and the cathode is proportional with the hydrogen ($H_2$) content of the fuel.

23. The sensor of clause 20, any other suitable clause, or any combination of suitable clauses, wherein the electrical potential difference between the anode and the cathode correlates to the amount of hydrogen ($H_2$) present in the fuel.

24. The sensor of clause 20, any other suitable clause, or any combination of suitable clauses, wherein the electrical potential difference between the anode and the cathode is proportional with the amount of hydrogen ($H_2$) present in the fuel.

25. The sensor of clause 20, any other suitable clause, or any combination of suitable clauses, wherein the electrical potential difference between the anode and the cathode is used as an estimated value for the actual hydrogen ($H_2$) content measurement of fuel.

26. The sensor of clause 20, any other suitable clause, or any combination of suitable clauses, wherein the electrical potential difference between the anode and the cathode is indicative of the extent of the reforming reaction.

27. The sensor of clause 20, any other suitable clause, or any combination of suitable clauses, wherein the electrical potential difference between the anode and the cathode is used to quantify the performance of the fuel reformer.

28. The sensor of clause 20, any other suitable clause, or any combination of suitable clauses, wherein the electrical potential difference between the anode and the cathode is used to quantify the efficacy of the fuel reformer.

29. The sensor of clause 1, any other suitable clause, or any combination of suitable clauses, wherein the fuel comprises a hydrocarbon fuel.

30. The sensor of clause 29, any other suitable clause, or any combination of suitable clauses, wherein the hydrocarbon fuel is a natural gas.

31. The sensor of clause 29, any other suitable clause, or any combination of suitable clauses, wherein the hydrocarbon fuel is methane.

32. The sensor of clause 29, any other suitable clause, or any combination of suitable clauses, wherein the hydrocarbon fuel is ethane.

33. The sensor of clause 29, any other suitable clause, or any combination of suitable clauses, wherein the hydrocarbon fuel is propane.

34. The sensor of clause 29, any other suitable clause, or any combination of suitable clauses, wherein the hydrocarbon fuel is methanol.

35. The sensor of clause 1, any other suitable clause, or any combination of suitable clauses, wherein the fuel comprises one or more compositions.

36. The sensor of clause 35, any other suitable clause, or any combination of suitable clauses, wherein the one or more compositions includes hydrogen.

37. The sensor of clause 35, any other suitable clause, or any combination of suitable clauses, wherein the one or more compositions includes water vapor.

38. The sensor of clause 35, any other suitable clause, or any combination of suitable clauses, wherein the one or more compositions includes carbon monoxide.

39. The sensor of clause 35, any other suitable clause, or any combination of suitable clauses, wherein the one or more compositions includes methane.

40. The sensor of clause 35, any other suitable clause, or any combination of suitable clauses, wherein the one or more compositions includes carbon dioxide.

41. The sensor of clause 1, any other suitable clause, or any combination of suitable clauses, wherein the fuel is converted to electricity by electrochemically combining the fuel at the anode and an oxidant at the cathode across the ionic conducting electrolyte layer.

42. The sensor of clause 41, any other suitable clause, or any combination of suitable clauses, wherein the oxidant at the cathode is air.

43. The sensor of clause 1, any other suitable clause, or any combination of suitable clauses, wherein the fuel cell system includes one or more fuel reformers.

44. The sensor of clause 43, any other suitable clause, or any combination of suitable clauses, wherein the one or more fuel reformers converts methane to hydrogen.

45. The sensor of clause 43, any other suitable clause, or any combination of suitable clauses, wherein the one or more fuel reformers converts fuel compositions to hydrogen.

46. The sensor of clause 43, any other suitable clause, or any combination of suitable clauses, wherein the one or more fuel reformers comprises one or more sensors.

47. The sensor of clause 43, any other suitable clause, or any combination of suitable clauses, wherein the one or more fuel reformers comprises one sensor.

48. The sensor of clause 43, any other suitable clause, or any combination of suitable clauses, wherein the one or more fuel reformers comprises two sensors.

49. The sensor of clause 43, any other suitable clause, or any combination of suitable clauses, wherein the one or more fuel reformers comprises more than two sensors.

50. The sensor of clause 43, any other suitable clause, or any combination of suitable clauses, wherein the one or more fuel reformers comprises three to five sensors.

51. The sensor of clause 43, any other suitable clause, or any combination of suitable clauses, wherein the one or more fuel reformers comprises three to ten sensors.

52. The sensor of clause 43, any other suitable clause, or any combination of suitable clauses, wherein the one or more fuel reformers is configured to incorporate one or more sensors.

53. The sensor of clause 43, any other suitable clause, or any combination of suitable clauses, wherein the one or more fuel reformers is coupled with one or more sensors.

54. The sensor of clause 43, any other suitable clause, or any combination of suitable clauses, wherein the one or more fuel reformers is affixed to one or more sensors.

55. The sensor of clause 1, any other suitable clause, or any combination of suitable clauses, wherein the fuel cell system is part of a power generation system.

56. The sensor of clause 1, any other suitable clause, or any combination of suitable clauses, wherein the fuel cell system comprises one or more fuel cells.

57. The sensor of clause 1, any other suitable clause, or any combination of suitable clauses, wherein the fuel cell system is operated in a stationary application.

58. The sensor of clause 1, any other suitable clause, or any combination of suitable clauses, wherein the fuel cell system is operated in a semi-stationary application.

59. The sensor of clause 1, any other suitable clause, or any combination of suitable clauses, wherein the fuel cell system is operated in a portable application.

60. The sensor of clause 1, any other suitable clause, or any combination of suitable clauses, wherein the fuel cell system is operated in a large-scale power system.

61. The sensor of clause 1, any other suitable clause, or any combination of suitable clauses, wherein the fuel cell system is provided with hydrogen via local reforming mechanisms of a fuel by a fuel reformer.

62. The sensor of clause 1, any other suitable clause, or any combination of suitable clauses, wherein the fuel cell system is provided with hydrogen via remote reforming of a fuel by a fuel reformer.

63. The sensor of clause 1, any other suitable clause, or any combination of suitable clauses, wherein the housing is any shape.

64. The sensor of clause 1, any other suitable clause, or any combination of suitable clauses, wherein the housing is any size.

65. The sensor of clause 1, any other suitable clause, or any combination of suitable clauses, wherein the housing is made of any material sufficient to contain the components of the sensor such that they may properly perform their functions.

66. The sensor of clause 1, any other suitable clause, or any combination of suitable clauses, wherein the housing is made of any metal sufficient to contain the components of the sensor such that they may properly perform their functions.

67. The sensor of clause 1, any other suitable clause, or any combination of suitable clauses, wherein the housing is made of any material and metal sufficient to contain the components of the sensor such that they may properly perform their functions.

68. The sensor of clause 1, any other suitable clause, or any combination of suitable clauses, wherein the housing is comprised of high temperature materials.

69. The sensor of clause 68, any other suitable clause, or any combination of suitable clauses, wherein the high temperature material is steel.

70. The sensor of clause 69, any other suitable clause, or any combination of suitable clauses, wherein the steel is 301H steel.

71. The sensor of clause 1, any other suitable clause, or any combination of suitable clauses, wherein the anode is comprised of metal.

72. The sensor of clause 1, any other suitable clause, or any combination of suitable clauses, wherein the anode is not comprised of metal.

73. The sensor of clause 1, any other suitable clause, or any combination of suitable clauses, wherein the cathode is comprised of metal.

74. The sensor of clause 1, any other suitable clause, or any combination of suitable clauses, wherein the cathode is not comprised of metal.

75. The sensor of clause 1, any other suitable clause, or any combination of suitable clauses, wherein the electrolyte transfers electrically charged particles from one electrode to the other electrode.

76. The sensor of clause 1, any other suitable clause, or any combination of suitable clauses, wherein the electrolyte is substantially impermeable to the fuel and the oxidant.

77. The sensor of clause 1, any other suitable clause, or any combination of suitable clauses, wherein the heater provides a consistent temperature.

78. The sensor of clause 1, any other suitable clause, or any combination of suitable clauses, wherein the heater provides a constant temperature.

79. The sensor of clause 78, any other suitable clause, or any combination of suitable clauses, wherein the constant temperature is at or above 300° C.

80. The sensor of clause 78, any other suitable clause, or any combination of suitable clauses, wherein the constant temperature is not below 300° C.

81. The sensor of clause 78, any other suitable clause, or any combination of suitable clauses, wherein the constant temperature is not below 500° C.

82. The sensor of clause 78, any other suitable clause, or any combination of suitable clauses, wherein the constant temperature ranges from about 300° C. to about 800° C.

83. The sensor of clause 78, any other suitable clause, or any combination of suitable clauses, wherein the constant temperature ranges from about 400° C. to about 800° C.

84. The sensor of clause 78, any other suitable clause, or any combination of suitable clauses, wherein the constant temperature ranges from about 500° C. to about 800° C.

85. The sensor of clause 78, any other suitable clause, or any combination of suitable clauses, wherein the constant temperature ranges from about 500° C. to about 800° C.±10-20° C.

86. The sensor of clause 78, any other suitable clause, or any combination of suitable clauses, wherein the constant temperature ranges from about 600° C. to about 800° C.

87. The sensor of clause 78, any other suitable clause, or any combination of suitable clauses, wherein the constant temperature ranges from about 650° C. to about 850° C.

88. The sensor of clause 78, any other suitable clause, or any combination of suitable clauses, wherein the constant temperature ranges from about 650° C. to about 800° C.

89. The sensor of clause 78, any other suitable clause, or any combination of suitable clauses, wherein the constant temperature ranges from about 700° C. to about 800° C.

90. The sensor of clause 78, any other suitable clause, or any combination of suitable clauses, wherein the constant temperature ranges from about 700° C. to about 750° C.

91. The sensor of clause 78, any other suitable clause, or any combination of suitable clauses, wherein the constant temperature is at or about 700° C.

92. The sensor of clause 78, any other suitable clause, or any combination of suitable clauses, wherein the constant temperature does not fluctuate any more than about ±1-5° C. from a high operating temperature.

93. The sensor of clause 78, any other suitable clause, or any combination of suitable clauses, wherein the constant temperature does not fluctuate any more than about ±5-10° C. from a high operating temperature.

94. The sensor of clause 78, any other suitable clause, or any combination of suitable clauses, wherein the constant temperature does not fluctuate any more than about ±10-20° C. from a high operating temperature.

95. The sensor of clause 1, any other suitable clause, or any combination of suitable clauses, wherein the heater provides a constant temperature from the anode to the cathode and across the electrolyte.

96. The sensor of clause 1, any other suitable clause, or any combination of suitable clauses, wherein the heater is provided with heat from flowing fluids.

97. The sensor of clause 1, any other suitable clause, or any combination of suitable clauses, wherein the heater is provided with heat externally.

98. The sensor of clause 1, any other suitable clause, or any combination of suitable clauses, wherein the heater is provided with heat from the sun.

99. The sensor of clause 1, any other suitable clause, or any combination of suitable clauses, wherein the heater is provided with heat from fire.

100. The sensor of clause 1, any other suitable clause, or any combination of suitable clauses, wherein the heater is provided with heat from electricity.

101. The sensor of clause 1, any other suitable clause, or any combination of suitable clauses, wherein the heater provides a constant temperature between the reformer inlet (RI) and the reformer outlet (RO).

102. The sensor of clause 1, any other suitable clause, or any combination of suitable clauses, wherein the heater provides a constant temperature between the reformer inlet (RI) and the stack inlet (SI).

103. The sensor of clause 1, any other suitable clause, or any combination of suitable clauses, wherein the heater provides a constant temperature between the reformer inlet (RI) and the reformer outlet and the stack inlet (RO/SI).

104. The sensor of clause 1, any other suitable clause, or any combination of suitable clauses, wherein one or more wires are electrical wires.

105. The sensor of clause 1, any other suitable clause, or any combination of suitable clauses, wherein one or more wires are at the anode.

106. The sensor of clause 1, any other suitable clause, or any combination of suitable clauses, wherein one or more wires are at the cathode.

107. The sensor of clause 1, any other suitable clause, or any combination of suitable clauses, wherein the hydrogen content of the fuel correlates to the potential and the voltage generated by the fuel cell of the sensor.

108. The sensor of clause 1, any other suitable clause, or any combination of suitable clauses, wherein the hydrogen content of the fuel is proportional to the potential and the voltage generated by the fuel cell of the sensor.

109. The sensor of clause 1, any other suitable clause, or any combination of suitable clauses, wherein the hydrogen content of fuel produced by a fuel reformer as compared to the amount of hydrogen in the fuel upon entrance from the fuel reformer is an indicator of the efficacy of performance of the fuel reformer.

110. The sensor of clause 1, any other suitable clause, or any combination of suitable clauses, wherein the hydrogen content of fuel produced by a fuel reformer as compared to the amount of hydrogen in the fuel upon entrance from the fuel reformer is an indicator of the efficiency of performance of the fuel reformer.

111. A method of using one or more sensors to estimate hydrogen content of fuel in a fuel cell system, comprising:
placing one or more sensor at the anode of a fuel cell,
measuring the voltage of the sensor, wherein the voltage is proportional to the value of
the hydrogen content of fuel in the fuel cell system.

112. The method of clause 111, any other suitable clause, or any combination of suitable clauses, wherein the one or more sensors comprise (1) a housing, (2) an anode, a cathode, and an electrolyte, (3) a heater, and (4) one or more wires.

113. The method of clause 112, any other suitable clause, or any combination of suitable clauses, wherein the housing of the one or more sensors is any shape.

114. The method of clause 112, any other suitable clause, or any combination of suitable clauses, wherein the housing of the one or more sensors is any size.

115. The method of clause 112, any other suitable clause, or any combination of suitable clauses, wherein the housing of the one or more sensors is made of any material sufficient to contain the components of the sensor such that they may properly perform their functions.

116. The method of clause 112, any other suitable clause, or any combination of suitable clauses, wherein the housing of the one or more sensors is made of any metal sufficient to contain the components of the sensor such that they may properly perform their functions.

117. The method of clause 112, any other suitable clause, or any combination of suitable clauses, wherein the housing of the one or more sensors is made of any material and metal sufficient to contain the components of the sensor such that they may properly perform their functions.

118. The method of clause 112, any other suitable clause, or any combination of suitable clauses, wherein the housing of the one or more sensors is comprised of high temperature materials.

119. The method of clause 118, any other suitable clause, or any combination of suitable clauses, wherein the high temperature material is steel.

120. The method of clause 119, any other suitable clause, or any combination of suitable clauses, wherein the steel is 301H steel.

121. The method of clause 112, any other suitable clause, or any combination of suitable clauses, wherein the anode of the one or more sensors is comprised of metal.

122. The method of clause 112, any other suitable clause, or any combination of suitable clauses, wherein the anode of the one or more sensors is not comprised of metal.

123. The method of clause 112, any other suitable clause, or any combination of suitable clauses, wherein the cathode of the one or more sensors is comprised of metal.

124. The method of clause 112, any other suitable clause, or any combination of suitable clauses, wherein the cathode of the one or more sensors is not comprised of metal.

125. The method of clause 112, any other suitable clause, or any combination of suitable clauses, wherein the electrolyte of the one or more sensors transfers electrically charged particles from one electrode to the other electrode.

126. The method of clause 112, any other suitable clause, or any combination of suitable clauses, wherein the electrolyte of the one or more sensors is substantially impermeable to the fuel and the oxidant.

127. The method of clause 112, any other suitable clause, or any combination of suitable clauses, wherein the heater of the one or more sensors provides a consistent temperature.

128. The method of clause 112, any other suitable clause, or any combination of suitable clauses, wherein the heater of the one or more sensors provides a constant temperature.

129. The method of clause 128, any other suitable clause, or any combination of suitable clauses, wherein the constant temperature is at or above 300° C.

130. The method of clause 128, any other suitable clause, or any combination of suitable clauses, wherein the constant temperature is not below 300° C.

131. The method of clause 128, any other suitable clause, or any combination of suitable clauses, wherein the constant temperature is not below 500° C.

132. The method of clause 128, any other suitable clause, or any combination of suitable clauses, wherein the constant temperature ranges from about 300° C. to about 800° C.

133. The method of clause 128, any other suitable clause, or any combination of suitable clauses, wherein the constant temperature ranges from about 400° C. to about 800° C.

134. The method of clause 128, any other suitable clause, or any combination of suitable clauses, wherein the constant temperature ranges from about 500° C. to about 800° C.

135. The method of clause 128, any other suitable clause, or any combination of suitable clauses, wherein the constant temperature ranges from about 500° C. to about 800° C.±10-20° C.

136. The method of clause 128, any other suitable clause, or any combination of suitable clauses, wherein the constant temperature ranges from about 600° C. to about 800° C.

137. The method of clause 128, any other suitable clause, or any combination of suitable clauses, wherein the constant temperature ranges from about 650° C. to about 850° C.

138. The method of clause 128, any other suitable clause, or any combination of suitable clauses, wherein the constant temperature ranges from about 650° C. to about 800° C.

139. The method of clause 128, any other suitable clause, or any combination of suitable clauses, wherein the constant temperature ranges from about 700° C. to about 800° C.

140. The method of clause 128, any other suitable clause, or any combination of suitable clauses, wherein the constant temperature ranges from about 700° C. to about 750° C.

141. The method of clause 128, any other suitable clause, or any combination of suitable clauses, wherein the constant temperature is at or about 700° C.

142. The method of clause 128, any other suitable clause, or any combination of suitable clauses, wherein the constant temperature does not fluctuate any more than about ±1-5° C. from a high operating temperature.

143. The method of clause 128, any other suitable clause, or any combination of suitable clauses, wherein the constant temperature does not fluctuate any more than about ±5-10° C. from a high operating temperature.

144. The method of clause 128, any other suitable clause, or any combination of suitable clauses, wherein the constant temperature does not fluctuate any more than about ±10-20° C. from a high operating temperature.

145. The method of clause 112, any other suitable clause, or any combination of suitable clauses, wherein the heater of the one or more sensors provides a constant temperature from the anode to the cathode and across the electrolyte.

146. The method of clause 112, any other suitable clause, or any combination of suitable clauses, wherein the heater of the one or more sensors is provided with heat from flowing fluids.

147. The method of clause 112, any other suitable clause, or any combination of suitable clauses, wherein the heater of the one or more sensors is provided with heat externally.

148. The method of clause 112, any other suitable clause, or any combination of suitable clauses, wherein the heater of the one or more sensors is provided with heat from the sun.

149. The method of clause 112, any other suitable clause, or any combination of suitable clauses, wherein the heater of the one or more sensors is provided with heat from fire.

150. The method of clause 112, any other suitable clause, or any combination of suitable clauses, wherein the heater of the one or more sensors is provided with heat from electricity.

151. The method of clause 112, any other suitable clause, or any combination of suitable clauses, wherein the heater of the one or more sensors provides a constant temperature between the reformer inlet (RI) and the reformer outlet (RO).

152. The method of clause 112, any other suitable clause, or any combination of suitable clauses, wherein the heater of the one or more sensors provides a constant temperature between the reformer inlet (RI) and the stack inlet (SI).

153. The method of clause 112, any other suitable clause, or any combination of suitable clauses, wherein the heater of the one or more sensors provides a constant temperature between the reformer inlet (RI) and the reformer outlet and the stack inlet (RO/SI).

154. The method of clause 112, any other suitable clause, or any combination of suitable clauses, wherein the one or more wires of the one or more sensors are electrical wires.

155. The method of clause 112, any other suitable clause, or any combination of suitable clauses, wherein the one or more wires of the one or more sensors are at the anode.

156. The method of clause 112, any other suitable clause, or any combination of suitable clauses, wherein the one or more wires of the one or more sensors are at the cathode.

157. The method of clause 111, any other suitable clause, or any combination of suitable clauses, wherein the one or more sensors comprise a fuel cell.

158. The method of clause 157, any other suitable clause, or any combination of suitable clauses, wherein the fuel cell is any size.

159. The method of clause 158, any other suitable clause, or any combination of suitable clauses, wherein the fuel cell size ranges from about 0.01 $cm^2$ to about 0.5 $cm^2$.

160. The method of clause 157, any other suitable clause, or any combination of suitable clauses, wherein the fuel cell is any shape.

161. The method of clause 160, any other suitable clause, or any combination of suitable clauses, wherein the fuel cell shape is a circle.

162. The method of clause 160, any other suitable clause, or any combination of suitable clauses, wherein the fuel cell shape is a square.

163. The method of clause 160, any other suitable clause, or any combination of suitable clauses, wherein the fuel cell shape is a rectangle.

164. The method of clause 157, any other suitable clause, or any combination of suitable clauses, wherein the fuel cell is a solid oxide fuel cell (SOFC).

165. The method of clause 157, any other suitable clause, or any combination of suitable clauses, wherein the fuel cell is a button or a miniature fuel cell.

166. The method of clause 165, any other suitable clause, or any combination of suitable clauses, wherein the button or a miniature fuel cell is any size.

167. The method of clause 166, any other suitable clause, or any combination of suitable clauses, wherein the button or miniature fuel cell size ranges from about 1 mm to about 5 mm in diameter.

168. The method of clause 165, any other suitable clause, or any combination of suitable clauses, wherein the button or a miniature fuel cell is any shape.

169. The method of clause 168, any other suitable clause, or any combination of suitable clauses, wherein the button or a miniature fuel cell shape is a circle.

170. The method of clause 168, any other suitable clause, or any combination of suitable clauses, wherein the button or a miniature fuel cell shape is a square.

171. The method of clause 168, any other suitable clause, or any combination of suitable clauses, wherein the button or a miniature fuel cell shape is a rectangle.

172. The method of clause 157, any other suitable clause, or any combination of suitable clauses, wherein the fuel cell is a phosphoric acid fuel cell (PAFC).

173. The method of clause 157, any other suitable clause, or any combination of suitable clauses, wherein the fuel cell is a molten carbonate fuel cell (MCFC).

174. The method of clause 157, any other suitable clause, or any combination of suitable clauses, wherein the fuel cell is a proton exchange membrane fuel cell (PEMFC).

175. The method of clause 111, any other suitable clause, or any combination of suitable clauses, wherein the one or more sensors measure an electrical potential difference between the anode and the cathode.

176. The method of clause 175, any other suitable clause, or any combination of suitable clauses, wherein the electrical potential difference between the anode and the cathode correlates to the hydrogen ($H_2$) content of the fuel.

177. The method of clause 175, any other suitable clause, or any combination of suitable clauses, wherein the electrical potential difference between the anode and the cathode is proportional with the hydrogen ($H_2$) content of the fuel.

178. The method of clause 175, any other suitable clause, or any combination of suitable clauses, wherein the electrical potential difference between the anode and the cathode correlates to the amount of hydrogen ($H_2$) present in the fuel.

179. The method of clause 175, any other suitable clause, or any combination of suitable clauses, wherein the electrical potential difference between the anode and the cathode is proportional with the amount of hydrogen ($H_2$) present in the fuel.

180. The method of clause 175, any other suitable clause, or any combination of suitable clauses, wherein the electrical potential difference between the anode and the cathode is used as an estimated value for the actual hydrogen ($H_2$) content measurement of fuel.

181. The method of clause 175, any other suitable clause, or any combination of suitable clauses, wherein the electrical potential difference between the anode and the cathode is indicative of the extent of the reforming reaction.

182. The method of clause 175, any other suitable clause, or any combination of suitable clauses, wherein the electrical potential difference between the anode and the cathode is used to quantify the performance of the fuel reformer.

183. The method of clause 175, any other suitable clause, or any combination of suitable clauses, wherein the electrical potential difference between the anode and the cathode is used to quantify the efficacy of the fuel reformer.

184. The method of clause 111, any other suitable clause, or any combination of suitable clauses, wherein the hydrogen content of the fuel correlates to the potential and the voltage generated by the fuel cell of the sensor.

185. The method of clause 111, any other suitable clause, or any combination of suitable clauses, wherein the hydrogen content of the fuel is proportional to the potential and the voltage generated by the fuel cell of the sensor.

186. The method of clause 111, any other suitable clause, or any combination of suitable clauses, wherein the hydrogen content of fuel produced by a fuel reformer as compared to the amount of hydrogen in the fuel upon entrance from the fuel reformer is an indicator of the efficacy of performance of the fuel reformer.

187. The method of clause 111, any other suitable clause, or any combination of suitable clauses, wherein the hydrogen content of fuel produced by a fuel reformer as compared to the amount of hydrogen in the fuel upon entrance from the fuel reformer is an indicator of the efficiency of performance of the fuel reformer.

188. The method of clause 111, any other suitable clause, or any combination of suitable clauses, wherein the fuel comprises a hydrocarbon fuel.

189. The method of clause 188, any other suitable clause, or any combination of suitable clauses, wherein the hydrocarbon fuel is a natural gas.

190. The method of clause 188, any other suitable clause, or any combination of suitable clauses, wherein the hydrocarbon fuel is methane.

191. The method of clause 188, any other suitable clause, or any combination of suitable clauses, wherein the hydrocarbon fuel is ethane.

192. The method of clause 188, any other suitable clause, or any combination of suitable clauses, wherein the hydrocarbon fuel is propane.

193. The method of clause 188, any other suitable clause, or any combination of suitable clauses, wherein the hydrocarbon fuel is methanol.

194. The method of clause 111, any other suitable clause, or any combination of suitable clauses, wherein the fuel comprises one or more compositions.

195. The method of clause 194, any other suitable clause, or any combination of suitable clauses, wherein the one or more compositions includes hydrogen.

196. The method of clause 194, any other suitable clause, or any combination of suitable clauses, wherein the one or more compositions includes water vapor.

197. The method of clause 194, any other suitable clause, or any combination of suitable clauses, wherein the one or more compositions includes carbon monoxide.

198. The method of clause 194, any other suitable clause, or any combination of suitable clauses, wherein the one or more compositions includes methane.

199. The method of clause 194, any other suitable clause, or any combination of suitable clauses, wherein the one or more compositions includes carbon dioxide.

200. The method of clause 111, any other suitable clause, or any combination of suitable clauses, wherein the fuel is converted to electricity by electrochemically combining the fuel at the anode and an oxidant at the cathode across the ionic conducting electrolyte layer.

201. The method of clause 200, any other suitable clause, or any combination of suitable clauses, wherein the oxidant at the cathode is air.

202. The method of clause 111, any other suitable clause, or any combination of suitable clauses, wherein the fuel cell system includes one or more fuel reformers.

203. The method of clause 202, any other suitable clause, or any combination of suitable clauses, wherein the one or more fuel reformers converts methane to hydrogen.

204. The method of clause 202, any other suitable clause, or any combination of suitable clauses, wherein the one or more fuel reformers converts fuel compositions to hydrogen.

205. The method of clause 202, any other suitable clause, or any combination of suitable clauses, wherein the one or more fuel reformers comprises one or more sensors.

206. The method of clause 202, any other suitable clause, or any combination of suitable clauses, wherein the one or more fuel reformers comprises one sensor.

207. The method of clause 202, any other suitable clause, or any combination of suitable clauses, wherein the one or more fuel reformers comprises two sensors.

208. The method of clause 202, any other suitable clause, or any combination of suitable clauses, wherein the one or more fuel reformers comprises more than two sensors.

209. The method of clause 202, any other suitable clause, or any combination of suitable clauses, wherein the one or more fuel reformers comprises three to five sensors.

210. The method of clause 202, any other suitable clause, or any combination of suitable clauses, wherein the one or more fuel reformers comprises three to ten sensors.

211. The method of clause 202, any other suitable clause, or any combination of suitable clauses, wherein the one or more fuel reformers is configured to incorporate one or more sensors.

212. The method of clause 202, any other suitable clause, or any combination of suitable clauses, wherein the one or more fuel reformers is coupled with one or more sensors.

213. The method of clause 202, any other suitable clause, or any combination of suitable clauses, wherein the one or more fuel reformers is affixed to one or more sensors.

214. The method of clause 111, any other suitable clause, or any combination of suitable clauses, wherein the fuel cell system is part of a power generation system.

215. The method of clause 111, any other suitable clause, or any combination of suitable clauses, wherein the fuel cell system comprises one or more fuel cells.

216. The method of clause 111, any other suitable clause, or any combination of suitable clauses, wherein the fuel cell system is operated in a stationary application.

217. The method of clause 111, any other suitable clause, or any combination of suitable clauses, wherein the fuel cell system is operated in a semi-stationary application.

218. The method of clause 111, any other suitable clause, or any combination of suitable clauses, wherein the fuel cell system is operated in a portable application.

219. The method of clause 111, any other suitable clause, or any combination of suitable clauses, wherein the fuel cell system is operated in a large-scale power system.

220. The method of clause 111, any other suitable clause, or any combination of suitable clauses, wherein the fuel cell system is provided with hydrogen via local reforming mechanisms of a fuel by a fuel reformer.

221. The method of clause 111, any other suitable clause, or any combination of suitable clauses, wherein the fuel cell system is provided with hydrogen via remote reforming of a fuel by a fuel reformer.

222. The method of clause 111, any other suitable clause, or any combination of suitable clauses, wherein the placing of one or more sensors at the anode of a fuel cell further comprises placing one or more wires of the one or more sensors at the anode of the fuel cell.

223. A method of using one or more sensors to measure the efficacy of a fuel reformer, comprising:
placing a sensor at the inlet of the fuel reformer,
placing a sensor at the outlet of the fuel reformer,
measuring the difference in voltage of the sensor located at the outlet of the fuel
reformer and the voltage measured at the sensor located at the inlet of the fuel reformer at a constant temperature.

224. The method of clause 223, any other suitable clause, or any combination of suitable clauses, wherein the one or more sensors comprise (1) a housing, (2) an anode, a cathode, and an electrolyte, (3) a heater, and (4) one or more wires.

225. The method of clause 224, any other suitable clause, or any combination of suitable clauses, wherein the housing of the one or more sensors is any shape.

226. The method of clause 224, any other suitable clause, or any combination of suitable clauses, wherein the housing of the one or more sensors is any size.

227. The method of clause 224, any other suitable clause, or any combination of suitable clauses, wherein the housing of the one or more sensors is made of any material sufficient to contain the components of the sensor such that they may properly perform their functions.

228. The method of clause 224, any other suitable clause, or any combination of suitable clauses, wherein the housing of the one or more sensors is made of any metal sufficient to contain the components of the sensor such that they may properly perform their functions.

229. The method of clause 224, any other suitable clause, or any combination of suitable clauses, wherein the housing of the one or more sensors is made of any material and metal sufficient to contain the components of the sensor such that they may properly perform their functions.

230. The method of clause 224, any other suitable clause, or any combination of suitable clauses, wherein the housing of the one or more sensors is comprised of high temperature materials.

231. The method of clause 230, any other suitable clause, or any combination of suitable clauses, wherein the high temperature material is steel.

232. The method of clause 231, any other suitable clause, or any combination of suitable clauses, wherein the steel is 301H steel.

233. The method of clause 224, any other suitable clause, or any combination of suitable clauses, wherein the anode of the one or more sensors is comprised of metal.

234. The method of clause 224, any other suitable clause, or any combination of suitable clauses, wherein the anode of the one or more sensors is not comprised of metal.

235. The method of clause 224, any other suitable clause, or any combination of suitable clauses, wherein the cathode of the one or more sensors is comprised of metal.

236. The method of clause 224, any other suitable clause, or any combination of suitable clauses, wherein the cathode of the one or more sensors is not comprised of metal.

237. The method of clause 224, any other suitable clause, or any combination of suitable clauses, wherein the electrolyte of the one or more sensors transfers electrically charged particles from one electrode to the other electrode.

238. The method of clause 224, any other suitable clause, or any combination of suitable clauses, wherein the electrolyte of the one or more sensors is substantially impermeable to the fuel and the oxidant.

239. The method of clause 224, any other suitable clause, or any combination of suitable clauses, wherein the heater of the one or more sensors provides a consistent temperature.

240. The method of clause 224, any other suitable clause, or any combination of suitable clauses, wherein the heater of the one or more sensors provides a constant temperature.

241. The method of clause 240, any other suitable clause, or any combination of suitable clauses, wherein the constant temperature is at or above 300° C.

242. The method of clause 240, any other suitable clause, or any combination of suitable clauses, wherein the constant temperature is not below 300° C.

243. The method of clause 240, any other suitable clause, or any combination of suitable clauses, wherein the constant temperature is not below 500° C.

244. The method of clause 240, any other suitable clause, or any combination of suitable clauses, wherein the constant temperature ranges from about 300° C. to about 800° C.

245. The method of clause 240, any other suitable clause, or any combination of suitable clauses, wherein the constant temperature ranges from about 400° C. to about 800° C.

246. The method of clause 240, any other suitable clause, or any combination of suitable clauses, wherein the constant temperature ranges from about 500° C. to about 800° C.

247. The method of clause 240, any other suitable clause, or any combination of suitable clauses, wherein the constant temperature ranges from about 500° C. to about 800° C.±10-20° C.

248. The method of clause 240, any other suitable clause, or any combination of suitable clauses, wherein the constant temperature ranges from about 600° C. to about 800° C.

249. The method of clause 240, any other suitable clause, or any combination of suitable clauses, wherein the constant temperature ranges from about 650° C. to about 850° C.

250. The method of clause 240, any other suitable clause, or any combination of suitable clauses, wherein the constant temperature ranges from about 650° C. to about 800° C.

251. The method of clause 240, any other suitable clause, or any combination of suitable clauses, wherein the constant temperature ranges from about 700° C. to about 800° C.

252. The method of clause 240, any other suitable clause, or any combination of suitable clauses, wherein the constant temperature ranges from about 700° C. to about 750° C.

253. The method of clause 240, any other suitable clause, or any combination of suitable clauses, wherein the constant temperature is at or about 700° C.

254. The method of clause 240, any other suitable clause, or any combination of suitable clauses, wherein the constant temperature does not fluctuate any more than about ±1-5° C. from a high operating temperature.

255. The method of clause 240, any other suitable clause, or any combination of suitable clauses, wherein the constant temperature does not fluctuate any more than about ±5-10° C. from a high operating temperature.

256. The method of clause 240, any other suitable clause, or any combination of suitable clauses, wherein the constant temperature does not fluctuate any more than about ±10-20° C. from a high operating temperature.

257. The method of clause 224, any other suitable clause, or any combination of suitable clauses, wherein the heater of the one or more sensors provides a constant temperature from the anode to the cathode and across the electrolyte.

258. The method of clause 224, any other suitable clause, or any combination of suitable clauses, wherein the heater of the one or more sensors is provided with heat from flowing fluids.

259. The method of clause 224, any other suitable clause, or any combination of suitable clauses, wherein the heater of the one or more sensors is provided with heat externally.

260. The method of clause 224, any other suitable clause, or any combination of suitable clauses, wherein the heater of the one or more sensors is provided with heat from the sun.

261. The method of clause 224, any other suitable clause, or any combination of suitable clauses, wherein the heater of the one or more sensors is provided with heat from fire.

262. The method of clause 224, any other suitable clause, or any combination of suitable clauses, wherein the heater of the one or more sensors is provided with heat from electricity.

263. The method of clause 224, any other suitable clause, or any combination of suitable clauses, wherein the heater of the one or more sensors provides a constant temperature between the reformer inlet (RI) and the reformer outlet (RO).

264. The method of clause 224, any other suitable clause, or any combination of suitable clauses, wherein the heater of the one or more sensors provides a constant temperature between the reformer inlet (RI) and the stack inlet (SI).

265. The method of clause 224, any other suitable clause, or any combination of suitable clauses, wherein the heater of the one or more sensors provides a constant temperature between the reformer inlet (RI) and the reformer outlet and the stack inlet (RO/SI).

266. The method of clause 224, any other suitable clause, or any combination of suitable clauses, wherein the one or more wires of the one or more sensors are electrical wires.

267. The method of clause 224, any other suitable clause, or any combination of suitable clauses, wherein the one or more wires of the one or more sensors are at the anode.

268. The method of clause 224, any other suitable clause, or any combination of suitable clauses, wherein the one or more wires of the one or more sensors are at the cathode.

269. The method of clause 223, any other suitable clause, or any combination of suitable clauses, wherein the one or more sensors comprise a fuel cell.

270. The method of clause 269, any other suitable clause, or any combination of suitable clauses, wherein the fuel cell is any size.

271. The method of clause 270, any other suitable clause, or any combination of suitable clauses, wherein the fuel cell size ranges from about 0.01 cm² to about 0.5 cm².

272. The method of clause 269, any other suitable clause, or any combination of suitable clauses, wherein the fuel cell is any shape.

273. The method of clause 272, any other suitable clause, or any combination of suitable clauses, wherein the fuel cell shape is a circle.

274. The method of clause 272, any other suitable clause, or any combination of suitable clauses, wherein the fuel cell shape is a square.

275. The method of clause 272, any other suitable clause, or any combination of suitable clauses, wherein the fuel cell shape is a rectangle.

276. The method of clause 269, any other suitable clause, or any combination of suitable clauses, wherein the fuel cell is a solid oxide fuel cell (SOFC).

277. The method of clause 269, any other suitable clause, or any combination of suitable clauses, wherein the fuel cell is a button or a miniature fuel cell.

278. The method of clause 277, any other suitable clause, or any combination of suitable clauses, wherein the button or a miniature fuel cell is any size.

279. The method of clause 278, any other suitable clause, or any combination of suitable clauses, wherein the button or miniature fuel cell size ranges from about 1 mm to about 5 mm in diameter.

280. The method of clause 277, any other suitable clause, or any combination of suitable clauses, wherein the button or a miniature fuel cell is any shape.

281. The method of clause 280, any other suitable clause, or any combination of suitable clauses, wherein the button or a miniature fuel cell shape is a circle.

282. The method of clause 280, any other suitable clause, or any combination of suitable clauses, wherein the button or a miniature fuel cell shape is a square.

283. The method of clause 280, any other suitable clause, or any combination of suitable clauses, wherein the button or a miniature fuel cell shape is a rectangle.

284. The method of clause 269, any other suitable clause, or any combination of suitable clauses, wherein the fuel cell is a phosphoric acid fuel cell (PAFC).

285. The method of clause 269, any other suitable clause, or any combination of suitable clauses, wherein the fuel cell is a molten carbonate fuel cell (MCFC).

286. The method of clause 269, any other suitable clause, or any combination of suitable clauses, wherein the fuel cell is a proton exchange membrane fuel cell (PEMFC).

287. The method of clause 223, any other suitable clause, or any combination of suitable clauses, wherein the one or more sensors measure an electrical potential difference between the anode and the cathode.

288. The method of clause 287, any other suitable clause, or any combination of suitable clauses, wherein the electrical potential difference between the anode and the cathode correlates to the hydrogen ($H_2$) content of the fuel.

289. The method of clause 287, any other suitable clause, or any combination of suitable clauses, wherein the electrical potential difference between the anode and the cathode is proportional with the hydrogen ($H_2$) content of the fuel.

290. The method of clause 287, any other suitable clause, or any combination of suitable clauses, wherein the electrical potential difference between the anode and the cathode correlates to the amount of hydrogen ($H_2$) present in the fuel.

291. The method of clause 287, any other suitable clause, or any combination of suitable clauses, wherein the electrical potential difference between the anode and the cathode is proportional with the amount of hydrogen ($H_2$) present in the fuel.

292. The method of clause 287, any other suitable clause, or any combination of suitable clauses, wherein the electrical potential difference between the anode and the cathode is used as an estimated value for the actual hydrogen ($H_2$) content measurement of fuel.

293. The method of clause 287, any other suitable clause, or any combination of suitable clauses, wherein the electrical potential difference between the anode and the cathode is indicative of the extent of the reforming reaction.

294. The method of clause 287, any other suitable clause, or any combination of suitable clauses, wherein the electrical potential difference between the anode and the cathode is used to quantify the performance of the fuel reformer.

295. The method of clause 287, any other suitable clause, or any combination of suitable clauses, wherein the electrical potential difference between the anode and the cathode is used to quantify the efficacy of the fuel reformer.

296. The method of clause 223, any other suitable clause, or any combination of suitable clauses, wherein the fuel reformer is part of a fuel cell system.

297. The method of clause 296, any other suitable clause, or any combination of suitable clauses, wherein the fuel cell system is part of a power generation system.

298. The method of clause 296, any other suitable clause, or any combination of suitable clauses, wherein the fuel cell system comprises one or more fuel cells.

299. The method of clause 296, any other suitable clause, or any combination of suitable clauses, wherein the fuel cell system is operated in a stationary application.

300. The method of clause 296, any other suitable clause, or any combination of suitable clauses, wherein the fuel cell system is operated in a semi-stationary application.

301. The method of clause 296, any other suitable clause, or any combination of suitable clauses, wherein the fuel cell system is operated in a portable application.

302. The method of clause 296, any other suitable clause, or any combination of suitable clauses, wherein the fuel cell system is operated in a large-scale power system.

303. The method of clause 296, any other suitable clause, or any combination of suitable clauses, wherein the fuel cell system is provided with hydrogen via local reforming mechanisms of a fuel by a fuel reformer.

304. The method of clause 296, any other suitable clause, or any combination of suitable clauses, wherein the fuel cell system is provided with hydrogen via remote reforming of a fuel by a fuel reformer.

305. The method of clause 223, any other suitable clause, or any combination of suitable clauses, wherein the fuel reformer is used to reform hydrocarbon fuel to produce hydrogen.

306. The method of clause 223, any other suitable clause, or any combination of suitable clauses, wherein the fuel reformer uses the byproduct of the fuel cell to convert hydrocarbon fuel into a reformed stream that contains substantial amounts of hydrogen.

307. The method of clause 223, any other suitable clause, or any combination of suitable clauses, wherein the fuel reformer is estimated to be degraded when the difference in sensor voltage is decreased over time 308. The method of clause 223, any other suitable clause, or any combination of suitable clauses, wherein the fuel reformer is estimated to not be degraded when the difference in sensor voltage measured remains relatively unchanged over time 309. The method of clause 223, any other suitable clause, or any combination of suitable clauses, wherein the fuel reformer converts methane to hydrogen.

310. The method of clause 223, any other suitable clause, or any combination of suitable clauses, wherein the fuel reformer converts fuel compositions to hydrogen.

311. The method of clause 223, any other suitable clause, or any combination of suitable clauses, wherein the fuel reformer comprises one or more sensors.

312. The method of clause 223, any other suitable clause, or any combination of suitable clauses, wherein the fuel reformer comprises one sensor.

313. The method of clause 223, any other suitable clause, or any combination of suitable clauses, wherein the fuel reformer comprises two sensors.

314. The method of clause 223, any other suitable clause, or any combination of suitable clauses, wherein the fuel reformer comprises more than two sensors.

315. The method of clause 223, any other suitable clause, or any combination of suitable clauses, wherein the fuel reformer comprises three to five sensors.

316. The method of clause 223, any other suitable clause, or any combination of suitable clauses, wherein the fuel reformer comprises three to ten sensors.

317. The method of clause 223, any other suitable clause, or any combination of suitable clauses, wherein the fuel reformer is configured to incorporate one or more sensors.

318. The method of clause 223, any other suitable clause, or any combination of suitable clauses, wherein the fuel reformer is coupled with one or more sensors.

319. The method of clause 223, any other suitable clause, or any combination of suitable clauses, wherein the fuel reformer is affixed to one or more sensors.

320. The method of clause 223, any other suitable clause, or any combination of suitable clauses, wherein the sensor at the inlet of the fuel reformer measures the gas composition of fuel as it enters the reformer.

321. The method of clause 320, any other suitable clause, or any combination of suitable clauses, wherein the inlet of the fuel reformer is where fuel enters the reformer.

322. The method of clause 223, any other suitable clause, or any combination of suitable clauses, wherein the sensor at the inlet of the fuel reformer measures the electrical potential.

323. The method of clause 322, any other suitable clause, or any combination of suitable clauses, wherein the electrical potential measured by the sensor at the inlet of the fuel reformer correlates to the hydrogen composition of the fuel entering the fuel reformer.

324. The method of clause 322, any other suitable clause, or any combination of suitable clauses, wherein the electrical potential measured by the sensor at the inlet of the fuel reformer serves as an estimated measure of the hydrogen content of the fuel.

325. The method of clause 223, any other suitable clause, or any combination of suitable clauses, wherein the sensor at the outlet of the fuel reformer measures the gas composition of fuel as it exits the reformer and enters the fuel cell stack.

326. The method of clause 325, any other suitable clause, or any combination of suitable clauses, wherein the outlet of the fuel reformer is where hydrogen exits the reformer and enters a fuel cell stack or a fuel cell stack inlet (SI).

327. The method of clause 223, any other suitable clause, or any combination of suitable clauses, wherein the sensor at the outlet of the fuel reformer measures the electrical potential.

328. The method of clause 327, any other suitable clause, or any combination of suitable clauses, wherein the electrical potential measured by the sensor at the outlet of the fuel reformer correlates to the hydrogen composition of the fuel exiting the fuel reformer.

329. The method of clause 327, any other suitable clause, or any combination of suitable clauses, wherein the electrical potential measured by the sensor at the outlet of the fuel reformer serves as an estimated measure of the hydrogen content of the fuel.

330. The method of clause 223, any other suitable clause, or any combination of suitable clauses, wherein the difference in voltage of the sensor located at the outlet of the fuel reformer and the voltage measured at the sensor located at the inlet of the fuel reformer indicates the quality and composition of fuel as it enters and exits a fuel reformer.

331. The method of clause 223, any other suitable clause, or any combination of suitable clauses, wherein the difference in voltage of the sensor located at the outlet of the fuel reformer and the voltage measured at the sensor located at the inlet of the fuel reformer is proportional to the value of the hydrogen content of fuel in the fuel cell system.

332. The method of clause 223, any other suitable clause, or any combination of suitable clauses, wherein the difference in voltage of the sensor located at the outlet of the fuel reformer and the voltage measured at the sensor located at the inlet of the fuel reformer is an indication of the efficacy of the fuel reformer.

333. The method of clause 223, any other suitable clause, or any combination of suitable clauses, wherein the difference in voltage of the sensor located at the outlet of the fuel reformer and the voltage measured at the sensor located at the inlet of the fuel reformer is an indication of the efficiency of the fuel reformer.

334. The method of clause 223, any other suitable clause, or any combination of suitable clauses, wherein the constant temperature is at or above 300° C.

335. The method of clause 223, any other suitable clause, or any combination of suitable clauses, wherein the constant temperature is not below 300° C.

336. The method of clause 223, any other suitable clause, or any combination of suitable clauses, wherein the constant temperature is not below 500° C.

337. The method of clause 223, any other suitable clause, or any combination of suitable clauses, wherein the constant temperature ranges from about 300° C. to about 800° C.

338. The method of clause 223, any other suitable clause, or any combination of suitable clauses, wherein the constant temperature ranges from about 400° C. to about 800° C.

339. The method of clause 223, any other suitable clause, or any combination of suitable clauses, wherein the constant temperature ranges from about 500° C. to about 800° C.

340. The method of clause 223, any other suitable clause, or any combination of suitable clauses, wherein the constant temperature ranges from about 500° C. to about 800° C.±10-20° C.

341. The method of clause 223, any other suitable clause, or any combination of suitable clauses, wherein the constant temperature ranges from about 600° C. to about 800° C.

342. The method of clause 223, any other suitable clause, or any combination of suitable clauses, wherein the constant temperature ranges from about 650° C. to about 850° C.

343. The method of clause 223, any other suitable clause, or any combination of suitable clauses, wherein the constant temperature ranges from about 650° C. to about 800° C.

344. The method of clause 223, any other suitable clause, or any combination of suitable clauses, wherein the constant temperature ranges from about 700° C. to about 800° C.

345. The method of clause 223, any other suitable clause, or any combination of suitable clauses, wherein the constant temperature ranges from about 700° C. to about 750° C.

346. The method of clause 223, any other suitable clause, or any combination of suitable clauses, wherein the constant temperature is at or about 700° C.

347. The method of clause 223, any other suitable clause, or any combination of suitable clauses, wherein the constant temperature does not fluctuate any more than about ±1-5° C. from a high operating temperature.

348. The method of clause 223, any other suitable clause, or any combination of suitable clauses, wherein the constant temperature does not fluctuate any more than about ±5-10° C. from a high operating temperature.

349. The method of clause 223, any other suitable clause, or any combination of suitable clauses, wherein the constant temperature does not fluctuate any more than about ±10-20° C. from a high operating temperature.

350. The method of clause 223, any other suitable clause, or any combination of suitable clauses, wherein the constant temperature is provided from the anode to the cathode and across the electrolyte.

351. A method of utilizing one or more sensors to measure the difference in sensor voltage and estimate the efficacy of a fuel reformer, comprising:
placing a sensor at the inlet of a fuel reformer,
placing a sensor at the outlet of the fuel reformer,
measuring the difference in voltage measured at the sensor located at the outlet of
the fuel reformer and the voltage measured at the sensor located at the inlet of the fuel reformer at a constant temperature,
wherein the fuel reformer is estimated to work properly and not be degraded when
the difference in voltage remains constant over time and the fuel reformer is estimated to be degraded when the difference in voltage is decreased over time.

352. The method of clause 351, any other suitable clause, or any combination of suitable clauses, wherein the one or more sensors comprise (1) a housing, (2) an anode, a cathode, and an electrolyte, (3) a heater, and (4) one or more wires.

353. The method of clause 352, any other suitable clause, or any combination of suitable clauses, wherein the housing of the one or more sensors is any shape.

354. The method of clause 352, any other suitable clause, or any combination of suitable clauses, wherein the housing of the one or more sensors is any size.

355. The method of clause 352, any other suitable clause, or any combination of suitable clauses, wherein the housing of the one or more sensors is made of any material sufficient to contain the components of the sensor such that they may properly perform their functions.

356. The method of clause 352, any other suitable clause, or any combination of suitable clauses, wherein the housing of the one or more sensors is made of any metal sufficient to contain the components of the sensor such that they may properly perform their functions.

357. The method of clause 352, any other suitable clause, or any combination of suitable clauses, wherein the housing of the one or more sensors is made of any material and metal sufficient to contain the components of the sensor such that they may properly perform their functions.

358. The method of clause 352, any other suitable clause, or any combination of suitable clauses, wherein the housing of the one or more sensors is comprised of high temperature materials.

359. The method of clause 358, any other suitable clause, or any combination of suitable clauses, wherein the high temperature material is steel.

360. The method of clause 359, any other suitable clause, or any combination of suitable clauses, wherein the steel is 301H steel.

361. The method of clause 352, any other suitable clause, or any combination of suitable clauses, wherein the anode of the one or more sensors is comprised of metal.

362. The method of clause 352, any other suitable clause, or any combination of suitable clauses, wherein the anode of the one or more sensors is not comprised of metal.

363. The method of clause 352, any other suitable clause, or any combination of suitable clauses, wherein the cathode of the one or more sensors is comprised of metal.

364. The method of clause 352, any other suitable clause, or any combination of suitable clauses, wherein the cathode of the one or more sensors is not comprised of metal.

365. The method of clause 352, any other suitable clause, or any combination of suitable clauses, wherein the electrolyte of the one or more sensors transfers electrically charged particles from one electrode to the other electrode.

366. The method of clause 352, any other suitable clause, or any combination of suitable clauses, wherein the electrolyte of the one or more sensors is substantially impermeable to the fuel and the oxidant.

367. The method of clause 352, any other suitable clause, or any combination of suitable clauses, wherein the heater of the one or more sensors provides a consistent temperature.

368. The method of clause 352, any other suitable clause, or any combination of suitable clauses, wherein the heater of the one or more sensors provides a constant temperature.

369. The method of clause 368, any other suitable clause, or any combination of suitable clauses, wherein the constant temperature is at or above 300° C.

370. The method of clause 368, any other suitable clause, or any combination of suitable clauses, wherein the constant temperature is not below 300° C.

371. The method of clause 368, any other suitable clause, or any combination of suitable clauses, wherein the constant temperature is not below 500° C.

372. The method of clause 368, any other suitable clause, or any combination of suitable clauses, wherein the constant temperature ranges from about 300° C. to about 800° C.

373. The method of clause 368, any other suitable clause, or any combination of suitable clauses, wherein the constant temperature ranges from about 400° C. to about 800° C.

374. The method of clause 368, any other suitable clause, or any combination of suitable clauses, wherein the constant temperature ranges from about 500° C. to about 800° C.

375. The method of clause 368, any other suitable clause, or any combination of suitable clauses, wherein the constant temperature ranges from about 500° C. to about 800° C.±10-20° C.

376. The method of clause 368, any other suitable clause, or any combination of suitable clauses, wherein the constant temperature ranges from about 600° C. to about 800° C.

377. The method of clause 368, any other suitable clause, or any combination of suitable clauses, wherein the constant temperature ranges from about 650° C. to about 850° C.

378. The method of clause 368, any other suitable clause, or any combination of suitable clauses, wherein the constant temperature ranges from about 650° C. to about 800° C.

379. The method of clause 368, any other suitable clause, or any combination of suitable clauses, wherein the constant temperature ranges from about 700° C. to about 800° C.

380. The method of clause 368, any other suitable clause, or any combination of suitable clauses, wherein the constant temperature ranges from about 700° C. to about 750° C.

381. The method of clause 368, any other suitable clause, or any combination of suitable clauses, wherein the constant temperature is at or about 700° C.

382. The method of clause 368, any other suitable clause, or any combination of suitable clauses, wherein the constant temperature does not fluctuate any more than about ±1-5° C. from a high operating temperature.

383. The method of clause 368, any other suitable clause, or any combination of suitable clauses, wherein the constant temperature does not fluctuate any more than about ±5-10° C. from a high operating temperature.

384. The method of clause 368, any other suitable clause, or any combination of suitable clauses, wherein the constant temperature does not fluctuate any more than about ±10-20° C. from a high operating temperature.

385. The method of clause 352, any other suitable clause, or any combination of suitable clauses, wherein the heater of the one or more sensors provides a constant temperature from the anode to the cathode and across the electrolyte.

386. The method of clause 352, any other suitable clause, or any combination of suitable clauses, wherein the heater of the one or more sensors is provided with heat from flowing fluids.

387. The method of clause 352, any other suitable clause, or any combination of suitable clauses, wherein the heater of the one or more sensors is provided with heat externally.

388. The method of clause 352, any other suitable clause, or any combination of suitable clauses, wherein the heater of the one or more sensors is provided with heat from the sun.

389. The method of clause 352, any other suitable clause, or any combination of suitable clauses, wherein the heater of the one or more sensors is provided with heat from fire.

390. The method of clause 352, any other suitable clause, or any combination of suitable clauses, wherein the heater of the one or more sensors is provided with heat from electricity.

391. The method of clause 352, any other suitable clause, or any combination of suitable clauses, wherein the heater of the one or more sensors provides a constant temperature between the reformer inlet (RI) and the reformer outlet (RO).

392. The method of clause 352, any other suitable clause, or any combination of suitable clauses, wherein the heater of the one or more sensors provides a constant temperature between the reformer inlet (RI) and the stack inlet (SI).

393. The method of clause 352, any other suitable clause, or any combination of suitable clauses, wherein the heater of the one or more sensors provides a constant temperature between the reformer inlet (RI) and the reformer outlet and the stack inlet (RO/SI).

394. The method of clause 352, any other suitable clause, or any combination of suitable clauses, wherein the one or more wires of the one or more sensors are electrical wires.

395. The method of clause 352, any other suitable clause, or any combination of suitable clauses, wherein the one or more wires of the one or more sensors are at the anode.

396. The method of clause 352, any other suitable clause, or any combination of suitable clauses, wherein the one or more wires of the one or more sensors are at the cathode.

397. The method of clause 351, any other suitable clause, or any combination of suitable clauses, wherein the one or more sensors comprise a fuel cell.

398. The method of clause 397, any other suitable clause, or any combination of suitable clauses, wherein the fuel cell is any size.

399. The method of clause 398, any other suitable clause, or any combination of suitable clauses, wherein the fuel cell size ranges from about 0.01 $cm^2$ to about 0.5 $cm^2$.

400. The method of clause 397, any other suitable clause, or any combination of suitable clauses, wherein the fuel cell is any shape.

401. The method of clause 400, any other suitable clause, or any combination of suitable clauses, wherein the fuel cell shape is a circle.

402. The method of clause 400, any other suitable clause, or any combination of suitable clauses, wherein the fuel cell shape is a square.

403. The method of clause 400, any other suitable clause, or any combination of suitable clauses, wherein the fuel cell shape is a rectangle.

404. The method of clause 397, any other suitable clause, or any combination of suitable clauses, wherein the fuel cell is a solid oxide fuel cell (SOFC).

405. The method of clause 397, any other suitable clause, or any combination of suitable clauses, wherein the fuel cell is a button or a miniature fuel cell.

406. The method of clause 405, any other suitable clause, or any combination of suitable clauses, wherein the button or a miniature fuel cell is any size.

407. The method of clause 406, any other suitable clause, or any combination of suitable clauses, wherein the button or miniature fuel cell size ranges from about 1 mm to about 5 mm in diameter.

408. The method of clause 405, any other suitable clause, or any combination of suitable clauses, wherein the button or a miniature fuel cell is any shape.

409. The method of clause 408, any other suitable clause, or any combination of suitable clauses, wherein the button or a miniature fuel cell shape is a circle.

410. The method of clause 408, any other suitable clause, or any combination of suitable clauses, wherein the button or a miniature fuel cell shape is a square.

411. The method of clause 408, any other suitable clause, or any combination of suitable clauses, wherein the button or a miniature fuel cell shape is a rectangle.

412. The method of clause 397, any other suitable clause, or any combination of suitable clauses, wherein the fuel cell is a phosphoric acid fuel cell (PAFC).

413. The method of clause 397, any other suitable clause, or any combination of suitable clauses, wherein the fuel cell is a molten carbonate fuel cell (MCFC).

414. The method of clause 397, any other suitable clause, or any combination of suitable clauses, wherein the fuel cell is a proton exchange membrane fuel cell (PEMFC).

415. The method of clause 351, any other suitable clause, or any combination of suitable clauses, wherein the one or more sensors measure an electrical potential difference between the anode and the cathode.

416. The method of clause 415, any other suitable clause, or any combination of suitable clauses, wherein the electrical potential difference between the anode and the cathode correlates to the hydrogen ($H_2$) content of the fuel.

417. The method of clause 415, any other suitable clause, or any combination of suitable clauses, wherein the electrical potential difference between the anode and the cathode is proportional with the hydrogen ($H_2$) content of the fuel.

418. The method of clause 415, any other suitable clause, or any combination of suitable clauses, wherein the electrical potential difference between the anode and the cathode correlates to the amount of hydrogen ($H_2$) present in the fuel.

419. The method of clause 415, any other suitable clause, or any combination of suitable clauses, wherein the electrical potential difference between the anode and the cathode is proportional with the amount of hydrogen ($H_2$) present in the fuel.

420. The method of clause 415, any other suitable clause, or any combination of suitable clauses, wherein the electrical potential difference between the anode and the cathode is used as an estimated value for the actual hydrogen ($H_2$) content measurement of fuel.

421. The method of clause 415, any other suitable clause, or any combination of suitable clauses, wherein the electrical potential difference between the anode and the cathode is indicative of the extent of the reforming reaction.

422. The method of clause 415, any other suitable clause, or any combination of suitable clauses, wherein the electrical potential difference between the anode and the cathode is used to quantify the performance of the fuel reformer.

423. The method of clause 415, any other suitable clause, or any combination of suitable clauses, wherein the electrical potential difference between the anode and the cathode is used to quantify the efficacy of the fuel reformer.

424. The method of clause 351, any other suitable clause, or any combination of suitable clauses, wherein the fuel reformer is part of a fuel cell system.

425. The method of clause 424, any other suitable clause, or any combination of suitable clauses, wherein the fuel cell system is part of a power generation system.

426. The method of clause 424, any other suitable clause, or any combination of suitable clauses, wherein the fuel cell system comprises one or more fuel cells.

427. The method of clause 424, any other suitable clause, or any combination of suitable clauses, wherein the fuel cell system is operated in a stationary application.

428. The method of clause 424, any other suitable clause, or any combination of suitable clauses, wherein the fuel cell system is operated in a semi-stationary application.

429. The method of clause 424, any other suitable clause, or any combination of suitable clauses, wherein the fuel cell system is operated in a portable application.

430. The method of clause 424, any other suitable clause, or any combination of suitable clauses, wherein the fuel cell system is operated in a large-scale power system.

431. The method of clause 424, any other suitable clause, or any combination of suitable clauses, wherein the fuel cell system is provided with hydrogen via local reforming mechanisms of a fuel by a fuel reformer.

432. The method of clause 424, any other suitable clause, or any combination of suitable clauses, wherein the fuel cell system is provided with hydrogen via remote reforming of a fuel by a fuel reformer.

433. The method of clause 351, any other suitable clause, or any combination of suitable clauses, wherein the fuel reformer is used to reform hydrocarbon fuel to produce hydrogen.

434. The method of clause 351, any other suitable clause, or any combination of suitable clauses, wherein the fuel reformer uses the byproduct of the fuel cell to convert hydrocarbon fuel into a reformed stream that contains substantial amounts of hydrogen.

435. The method of clause 351, any other suitable clause, or any combination of suitable clauses, wherein the fuel reformer is estimated to be degraded when the difference in sensor voltage is decreased over time.

436. The method of clause 351, any other suitable clause, or any combination of suitable clauses, wherein the fuel reformer is estimated to not be degraded when the difference in sensor voltage measured remains relatively unchanged over time.

437. The method of clause 351, any other suitable clause, or any combination of suitable clauses, wherein the fuel reformer converts methane to hydrogen.

438. The method of clause 351, any other suitable clause, or any combination of suitable clauses, wherein the fuel reformer converts fuel compositions to hydrogen.

439. The method of clause 351, any other suitable clause, or any combination of suitable clauses, wherein the fuel reformer comprises one or more sensors.

440. The method of clause 351, any other suitable clause, or any combination of suitable clauses, wherein the fuel reformer comprises one sensor.

441. The method of clause 351, any other suitable clause, or any combination of suitable clauses, wherein the fuel reformer comprises two sensors.

442. The method of clause 351, any other suitable clause, or any combination of suitable clauses, wherein the fuel reformer comprises more than two sensors.

443. The method of clause 351, any other suitable clause, or any combination of suitable clauses, wherein the fuel reformer comprises three to five sensors.

444. The method of clause 351, any other suitable clause, or any combination of suitable clauses, wherein the fuel reformer comprises three to ten sensors.

445. The method of clause 351, any other suitable clause, or any combination of suitable clauses, wherein the fuel reformer is configured to incorporate one or more sensors.

446. The method of clause 351, any other suitable clause, or any combination of suitable clauses, wherein the fuel reformer is coupled with one or more sensors.

447. The method of clause 351, any other suitable clause, or any combination of suitable clauses, wherein the fuel reformer is affixed to one or more sensors.

448. The method of clause 351, any other suitable clause, or any combination of suitable clauses, wherein the efficacy of a fuel reformer is based on the difference in the potential measured by one or more sensors.

449. The method of clause 351, any other suitable clause, or any combination of suitable clauses, wherein the efficacy of a fuel reformer is greater when the difference between the potential measured at the outlet of the fuel reformer and the potential measured at the inlet of the fuel reformer is higher.

450. The method of clause 351, any other suitable clause, or any combination of suitable clauses, wherein the efficacy of a fuel reformer is lower when the difference between the potential measured at the outlet of the fuel reformer and the potential measured at the inlet of the fuel reformer is lower.

451. The method of clause 351, any other suitable clause, or any combination of suitable clauses, wherein the sensor at the inlet of the fuel reformer measures the gas composition of fuel as it enters the reformer.

452. The method of clause 451, any other suitable clause, or any combination of suitable clauses, wherein the inlet of the fuel reformer is where fuel enters the reformer.

453. The method of clause 351, any other suitable clause, or any combination of suitable clauses, wherein the sensor at the inlet of the fuel reformer measures the electrical potential.

454. The method of clause 453, any other suitable clause, or any combination of suitable clauses, wherein the electrical potential measured by the sensor at the inlet of the fuel reformer correlates to the hydrogen composition of the fuel entering the fuel reformer.

455. The method of clause 453, any other suitable clause, or any combination of suitable clauses, wherein the electrical potential measured by the sensor at the inlet of the fuel reformer serves as an estimated measure of the hydrogen content of the fuel.

456. The method of clause 351, any other suitable clause, or any combination of suitable clauses, wherein the sensor at the outlet of the fuel reformer measures the gas composition of fuel as it exits the reformer and enters the fuel cell stack.

457. The method of clause 456, any other suitable clause, or any combination of suitable clauses, wherein the outlet of the fuel reformer is where hydrogen exits the reformer and enters a fuel cell stack or a fuel cell stack inlet (SI).

458. The method of clause 351, any other suitable clause, or any combination of suitable clauses, wherein the sensor at the outlet of the fuel reformer measures the electrical potential.

459. The method of clause 458, any other suitable clause, or any combination of suitable clauses, wherein the electrical potential measured by the sensor at the outlet of the fuel reformer correlates to the hydrogen composition of the fuel exiting the fuel reformer.

460. The method of clause 458, any other suitable clause, or any combination of suitable clauses, wherein the electrical potential measured by the sensor at the outlet of the fuel reformer serves as an estimated measure of the hydrogen content of the fuel.

461. The method of clause 351, any other suitable clause, or any combination of suitable clauses, wherein the difference in voltage of the sensor located at the outlet of the fuel reformer and the voltage measured at the sensor located at the inlet of the fuel reformer measures the quality and composition of fuel as it enters and exits a fuel reformer.

462. The method of clause 351, any other suitable clause, or any combination of suitable clauses, wherein the difference in voltage of the sensor located at the outlet of the fuel reformer and the voltage measured at the sensor located at the inlet of the fuel reformer is proportional to the value of the hydrogen content of fuel in the fuel cell system.

463. The method of clause 351, any other suitable clause, or any combination of suitable clauses, wherein the difference in voltage of the sensor located at the outlet of the fuel reformer and the voltage measured at the sensor located at the inlet of the fuel reformer is an indication of the efficacy of the fuel reformer.

464. The method of clause 351, any other suitable clause, or any combination of suitable clauses, wherein the difference in voltage of the sensor located at the outlet of the fuel reformer and the voltage measured at the sensor located at the inlet of the fuel reformer is an indication of the efficiency of the fuel reformer.

465. The method of clause 351, any other suitable clause, or any combination of suitable clauses, wherein the constant temperature is at or above 300° C.

466. The method of clause 351, any other suitable clause, or any combination of suitable clauses, wherein the constant temperature is not below 300° C.

467. The method of clause 351, any other suitable clause, or any combination of suitable clauses, wherein the constant temperature is not below 500° C.

468. The method of clause 351, any other suitable clause, or any combination of suitable clauses, wherein the constant temperature ranges from about 300° C. to about 800° C.

469. The method of clause 351, any other suitable clause, or any combination of suitable clauses, wherein the constant temperature ranges from about 400° C. to about 800° C.

470. The method of clause 351, any other suitable clause, or any combination of suitable clauses, wherein the constant temperature ranges from about 500° C. to about 800° C.

471. The method of clause 351, any other suitable clause, or any combination of suitable clauses, wherein the constant temperature ranges from about 500° C. to about 800° C.±10-20° C.

472. The method of clause 351, any other suitable clause, or any combination of suitable clauses, wherein the constant temperature ranges from about 600° C. to about 800° C.

473. The method of clause 351, any other suitable clause, or any combination of suitable clauses, wherein the constant temperature ranges from about 650° C. to about 850° C.

474. The method of clause 351, any other suitable clause, or any combination of suitable clauses, wherein the constant temperature ranges from about 650° C. to about 800° C.

475. The method of clause 351, any other suitable clause, or any combination of suitable clauses, wherein the constant temperature ranges from about 700° C. to about 800° C.

476. The method of clause 351, any other suitable clause, or any combination of suitable clauses, wherein the constant temperature ranges from about 700° C. to about 750° C.

477. The method of clause 351, any other suitable clause, or any combination of suitable clauses, wherein the constant temperature is at or about 700° C.

478. The method of clause 351, any other suitable clause, or any combination of suitable clauses, wherein the constant temperature does not fluctuate any more than about ±1-5° C. from a high operating temperature.

479. The method of clause 351, any other suitable clause, or any combination of suitable clauses, wherein the constant temperature does not fluctuate any more than about ±5-10° C. from a high operating temperature.

480. The method of clause 351, any other suitable clause, or any combination of suitable clauses, wherein the constant temperature does not fluctuate any more than about ±10-20° C. from a high operating temperature.

481. The method of clause 351, any other suitable clause, or any combination of suitable clauses, wherein the constant temperature is provided from the anode to the cathode and across the electrolyte.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features.

Unless defined otherwise, technical and scientific terms used herein have the same meaning as is commonly understood by one of ordinary skill in the art to which this disclosure belongs. The terms "first," "second," "third" and the like, as used herein do not denote any order or importance, but rather are used to distinguish one element from another. The term "or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising," "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps.

The phrase "consisting of" or "consists of" refers to a compound, composition, formulation, or method that excludes the presence of any additional elements, components, or method steps. The term "consisting of" also refers to a compound, composition, formulation, or method of the present disclosure that excludes the presence of any additional elements, components, or method steps.

The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A sensor for measuring the quality of fuel in a fuel cell system, comprising:
   a housing,
   an anode, a cathode, and an electrolyte,
   a heater, and
   one or more wires,
   wherein the one or more wires are coupled with the anode and cathode to measure the electrical potential from the anode to the cathode across the electrolyte,
   wherein the heater provides a constant temperature within the range of from about 300° C. to about 800° C.,
   wherein the electrical potential is an estimated value of the hydrogen content of fuel in the fuel cell system, and
   wherein the hydrogen content indicates the quality of the fuel in the fuel cell system.

2. The sensor of claim 1, wherein the heater provides a constant temperature at about 700° C.

3. The sensor of claim 1, wherein the sensor comprises a fuel cell.

4. The sensor of claim 3, wherein the fuel cell is a solid oxide fuel cell (SOFC).

5. The sensor of claim 3, wherein the fuel cell is a button or a miniature fuel cell.

6. The sensor of claim 5, wherein the button or miniature fuel cell has a size ranging from about 1 mm to about 5 mm.

7. A method of using one or more sensors to estimate hydrogen content of fuel in a fuel cell system, comprising:
   placing one or more sensor at the anode of a fuel cell,
   heating the one or more sensor to a constant temperature within the range of from about 300° C. to about 800° C., and
   measuring the voltage of the sensor,
   wherein the voltage is proportional to the value of the hydrogen content of fuel in the fuel cell system.

8. The method of claim 7, wherein a heater provides a constant temperature at about 700° C. to the one or more sensor.

9. The method of claim 7, wherein the fuel cell is a solid oxide fuel cell (SOFC).

10. A method of using one or more sensors to measure the efficacy of a fuel reformer, comprising:
    placing a sensor at the inlet of the fuel reformer,
    placing a sensor at the outlet of the fuel reformer,
    measuring the difference in voltage of the sensor located at the outlet of the fuel reformer and the voltage measured at the sensor located at the inlet of the fuel reformer at a constant temperature.

11. The method of claim 10, wherein the fuel reformer is estimated to be degraded when the difference in sensor voltage is decreased over time.

12. The method of claim 10, wherein the fuel reformer is estimated to not be degraded when the difference in sensor voltage remains relatively unchanged over time.

13. The method of claim 10, wherein the constant temperature ranges from about 500° C. to about 800° C.

14. The method of claim 12, wherein the constant temperature is about 700° C.

15. The method of claim 10, wherein the fuel cell is a solid oxide fuel cell (SOFC).

16. The sensor of claim 1, wherein the housing is made of a high temperature material.

17. The sensor of claim 16, wherein the high temperature material is steel.

18. The sensor of claim 3, wherein the hydrogen content of the fuel correlates to the electric potential or a voltage generated by the fuel cell of the sensor.

* * * * *